US007578332B2

(12) United States Patent
Murata et al.

(10) Patent No.: US 7,578,332 B2
(45) Date of Patent: Aug. 25, 2009

(54) PRINTER

(75) Inventors: Shoichi Murata, Matsumoto (JP); Hideki Kawakami, Hata-machi (JP); Masahiko Yamada, Omi-mura (JP); Tomoaki Kimura, Shiojin (JP)

(73) Assignee: Seiko Epson Corporation (JP)

( * ) Notice: Subject to any disclaimer, the term of this patent is extended or adjusted under 35 U.S.C. 154(b) by 446 days.

(21) Appl. No.: 11/317,355

(22) Filed: Dec. 23, 2005

(65) Prior Publication Data

US 2006/0151118 A1 Jul. 13, 2006

(30) Foreign Application Priority Data

Dec. 27, 2004 (JP) ............................. 2004-375695
Feb. 25, 2005 (JP) ............................. 2005-051722
Sep. 2, 2005 (JP) ............................. 2005-254498

(51) Int. Cl.
*B65C 11/02* (2006.01)
*B29C 65/00* (2006.01)
*B32B 38/14* (2006.01)
*B32B 39/00* (2006.01)
*B32B 41/00* (2006.01)
*G05G 15/00* (2006.01)

(52) U.S. Cl. ....................... 156/384; 156/350; 156/352; 156/537; 156/539

(58) Field of Classification Search ................. 156/247, 156/289, 384, 537, 539–541, DIG. 33, 250, 156/352; 400/82, 625, 645, 692, 693
See application file for complete search history.

(56) References Cited

U.S. PATENT DOCUMENTS 5,718,527 A * 2/1998 Fujimoto et al. ......... 400/616.1
5,980,138 A 11/1999 Shiozaki et al.

(Continued)

FOREIGN PATENT DOCUMENTS

JP 06-156463 6/1994

(Continued)

OTHER PUBLICATIONS

European Search Report which issued in the corresponding EP application No. 05 027 312.7-1251, citing the above references.

*Primary Examiner*—Philip C Tucker
*Assistant Examiner*—Sing P Chan
(74) *Attorney, Agent, or Firm*—Baker & Hostetler, LLP

(57) ABSTRACT

A printer with a peeler mechanism 1 for peeling labels from a web, the printer having a movable web pressure roller 24 which may be moved from a web pressure position 24A in which pressure is applied to a platen roller 20 to a retracted position 24B in which pressure is not applied. The printer also has a photosensor 21 and photoreceptor having an emitter/receptor surface 21*a* for detecting the presence and absence of labels peeled from the web. A window 22*b* in the label guide surface 22*a* becomes covered to shield the photosensor output for defining a no-label detection stateWhether the peeler mechanism is set to operate in the label peeling mode or is set to a retracted position defining a non-peeling continuous label dispensing mode of operation can be determined based on the output of the label detection photosensor 21, and the label dispensing mode can be set to the label peeling mode or continuous label dispensing mode based on this determination.

14 Claims, 15 Drawing Sheets

U.S. PATENT DOCUMENTS

| | | | |
|---|---|---|---|
| 6,068,419 | A | 5/2000 | Shiozaki et al. |
| 6,530,705 | B1 | 3/2003 | Petteruti et al. |

FOREIGN PATENT DOCUMENTS

| | | |
|---|---|---|
| JP | 09-166227 | 6/1994 |
| JP | 08-295323 | 12/1996 |
| JP | 08-202491 | 8/1997 |
| JP | 11-199090 | 7/1999 |
| JP | 2002-128039 | 5/2002 |
| JP | 2004-042431 | 2/2004 |

* cited by examiner

PRINTER

TECHNICAL FIELD

The present invention relates to a printer comprising a peeler for peeling labels from a web, and more particularly to a printer comprising a peeler having an adjustable member that can switch the peeler between an operating mode for peeling and dispensing labels one at a time, and a separate operating mode for discharging the web with (printing) labels thereon continuously without peeling off the labels.

BACKGROUND ART

The peeler mechanism in a printer with a label peeler guides the web on which the labels are adhesively affixed around a peeler bar or other peeler member at an angle of 90 degrees or less. When the web is thus guided through a transportation path that curves in an acute angle, the stiffness of the labels affixed to the web surface causes the labels to peel away and separate from the web. The peeled labels are then discharged from a label exit, and the operator can easily remove the peeled labels thus dispensed from the label exit.

If the label that is discharged from the label exit is not removed by the user and thus remains in the label exit when the next label is similarly discharged, the labels will stick together in the label exit, eventually resulting in a paper jam. To prevent such problems, an optical label sensor is typically disposed near the label exit to detect if a label is in the label exit.

When operating in the label peeling mode that peels the labels one by one from the web, printing the next label starts when the optical label sensor detects that the discharged label has been removed. When operating in the continuous label discharge mode in which the labels are discharged in a continuous stream intact on the web, however, the label paper is fed in a relatively straight path directly out from the label exit instead of passing through the path that curves the web in an acute angle. The label sensor in this case always detects either a label or the web, and the label dispensing mode therefore cannot be controlled based on the label sensor output (the label sensor output does not change).

The continuous label dispensing mode must therefore be controlled either by invalidating (disabling) label sensor output or by changing the label dispensing operation based on the label sensor output. Operator input to change the label dispensing mode is, however, required to change the control method.

Japanese Unexamined Patent Application H08-295323 teaches a label printer that can recognize the label dispensing mode based on how the web is loaded without requiring operator input. The disclosed label printer has a web sensor disposed to the web discharge path to which the web is loaded when operating in the label peeling mode. When the web sensor detects the web, the printer knows that the peeler is set to operate in the label peeling mode. The web is fed in another path in which the web sensor is disposed when in the label peeling mode.

To change the label peeling mode to the continuous label dispensing mode in a conventional printer with a peeler, operator input is required to switch to a control mode that disables so as to ignore the output from the label sensor disposed at the label exit, or to a control mode that is not based on label sensor output. Problems can result when the operator forgets to change the control mode because how the web is loaded in the peeler may not match the label dispensing mode that is known to the printer control system. Printer usability and operability can thus be improved by eliminating the need for such operator input.

Furthermore, disposing a web sensor to the web discharge path to recognize a change in the label dispensing mode requires a web sensor in addition to a label sensor, thus increasing both device size and cost. Providing a place to locate the web sensor can also be difficult because the web discharge path is generally located near the label exit where very little space is available.

The present invention is directed to a printer having a peeler mechanism that can operate in a label dispensing mode corresponding to the setup of the peeler mechanism without requiring user input to change the label dispensing mode setting or requiring a web sensor to detect the label dispensing mode.

The present invention thus provides a printer with a peeler mechanism that can recognize how the peeler mechanism is set based on output from a label sensor disposed at the label exit. The peeler mechanism can control operation based on label sensor output in both the continuous label dispensing mode and the label peeling mode.

SUMMARY OF THE INVENTION

A printer comprising a peeler mechanism having an adjustable member that can be switched to a peeling position for peeling labels from a web and a retracted position in which labels are not peeled from the web; a label exit for discharging peeled labels; and a label detection unit for detecting if a peeled label remains in the label exit. When the peeler mechanism is switched to the retracted position, the label detection unit is switched in conjunction therewith to a label detection disabled state in which the label detection unit output indicates there is no label in the label exit and the output (signal) state does not change.

When the peeler mechanism in the printer changes to the retracted position, the label detection unit also changes to a label detection disabled state. The label detection unit thereafter continues to output that a label is not detected in the label exit and the output signal state does not change. The printer can therefore recognize when the peeler mechanism is switched to the retracted position, that is, when the printer is changed from the label peeling mode to the continuous label dispensing mode. Because the detector output that normally changes when labels are dispensed one at a time does not change when the web is conveyed and discharged from the label exit, the printer can detect that the peeler mechanism is set to the retracted position.

Furthermore, because a label sensor (detector) output constantly indicates that a label is not in the label exit, the printer can operate based on this output in a continuous label dispensing mode for printing and issuing multiple labels continuously while intact on the web. Operation in the label peeling mode and continuous label dispensing mode can thus be directly controlled based on the output from the label detection unit.

The label detection unit in the printer of the present invention is preferably a photosensor that detects label presence based on a detection beam (a infrared ray) that is reflected or blocked by the label. The printer also has a shield member that can set the label detection unit into a disabled state by shielding at least the photoreceptor portion of the photosensor.

If a reflection type photosensor is used, photosensor output will be held in a fixed or constant state indicating that no label is detected when the photoreceptor is shielded preventing reflected light from being detected. Whether the peeler mechanism is switched to the retracted position, that is, to the continuous label dispensing mode, can therefore be determined based on photosensor output.

In a preferred embodiment the peeler mechanism of the printer has a web pressure roller that can move between a web pressure position for conveying the web after labels are peeled therefrom and a retracted position removed from said web pressure position. The web pressure roller is held in the web pressure position when the peeler mechanism is in the peeling position, and the web pressure roller is switched to the retracted position when the peeler mechanism is in the retracted position. In this case, the printer preferably has a linkage mechanism that moves the shield member in conjunction with movement of the web pressure roller.

In addition the peeler mechanism may have a pivot member that supports the web pressure roller. The pivot member can pivot between a first pivot position and a second pivot position, with the web pressure roller in the web pressure position when the pivot member is in the first pivot position, and the web pressure roller in the retracted position when the pivot member is in the second pivot position. The linkage mechanism in this case is preferably a cam mechanism that converts the pivoting motion of the pivot member to the moving motion of the shield member.

In another embodiment of the present invention the label detection unit is held by a specific urging force to stop in a first position straddling the label exit (interfering with a label), and is composed of a label detection lever that can pivot in the label discharge direction when pushed by a discharged label, and a lever detection unit that detects if the label detection lever is in the first position. The label detection lever moves to a second position not interfering with a label discharged from the label exit in conjunction with the peeler mechanism being switched to the retracted position, and when in said second position a part of the label detection lever is held constantly in the detection range of the lever detection unit and the label detection undetected and disabled state is thus set.

When the peeler mechanism changes to the retracted position, that is, when the label peeling mode is switched to the continuous label dispensing mode, the label detection lever moves to the second position and a part of the label detection lever remains held in the detection range (area) of the lever detection unit. As a result, lever detection unit output is held in the state with the detection lever stopped in the first position and output indicating that a label is not detected in the label exit. Based on this unchanging output state, the printer can recognize that the peeler mechanism has moved to the retracted position, that is, that the label peeling mode has changed to the continuous label dispensing mode. Furthermore, because detector output does not change and continuously indicates that a label is not in the label exit, the printer can be controlled in the same way in the label peeling mode and the continuous label dispensing mode based on the detector output without doing anything else in particular.

To assure that a part of the label detection lever remains positioned in the detection range of the lever detection unit when the label detection lever moves to the second position, the label detection lever is rendered to pivot between said first position and said second position on a pivot point positioned in the detection range of the lever detection unit. The lever can thus be detected even at the first position and the second position.

Further preferably, the peeler mechanism has a web pressure roller that can move between a web pressure position for conveying the web after labels are peeled therefrom and a retracted position removed from said web pressure position; and the web pressure roller is held in the web pressure position when the peeler mechanism is in the peeling position, and the web pressure roller is switched to the retracted position when the peeler mechanism is in the retracted position.

Yet further preferably, the peeler mechanism has a pivot member that supports the web pressure roller. This pivot member can pivot between a first pivot position and a second pivot position on a pivot point passing through the detection range of the lever detection unit, the web pressure roller is in the web pressure position when the pivot member is in the first pivot position, and the web pressure roller is in the retracted position when the pivot member is in the second pivot position.

Yet further preferably, the label detection lever is supported by the pivot member so that the label detection lever is in the first position when the pivot member is in the first pivot position, and the label detection lever switches to the second position when the pivot member rotates to the second pivot position.

Yet further preferably, the label detection lever supported by the pivot member in the first pivot position is positioned between the label exit and the web discharge path from which the web is discharged after labels are peeled.

In this case the label detection lever can function as a guide member for guiding labels peeled from the web so that the labels do not move towards the web.

Yet further preferably, a shoulder or other guide unit for guiding labels in the label discharge direction is formed on the label contact surface of the label detection lever contacted by the discharged labels.

Yet further preferably, the label sliding resistance in the label discharge direction of the label contact surface of the label detection lever that contacts discharged labels is less than the label sliding resistance in the opposite direction so that labels can be guided smoothly to the label exit.

Yet further preferably, the label contact surface of the label detection lever that contacts discharged labels is surface processed to contact the discharged labels at a point or line so that the labels do not stick to the label contact surface of the label detection lever.

The printer may further comprise a print head, a paper transportation mechanism, and a drive control unit that controls driving the print head and paper transportation mechanism based upon a determination of whether the peeler mechanism is in the peeling position or in the retracted position. The drive control unit determines that the peeler mechanism is in the peeling position if the detection output of the label detection unit changes to indicate detection of a label after the paper transportation mechanism conveys the recording medium a specific distance, and determines that the peeler mechanism is in the retracted position if the label detection unit output does not change.

The printer according to the present invention can recognize the operating state of the peeler mechanism based on the output of a label detection unit, and can control label printing based on this output in either a label peeling mode or a continuous label dispensing mode. A web sensor or other sensor for detecting a change in the operating mode is therefore not needed.

Furthermore, user input to change the operating mode and a control process to invalidate output from the label detection unit are therefore not necessary, and operation can be controlled based on label detection unit output without doing anything in particular even when the label printing mode changes.

Yet further, the peeler setting can be directly detected by the label detection unit and the operating mode can be changed accordingly. Problems arising from a mismatch between how the paper is actually loaded to the peeler mechanism and the label printing mode setting of the printer are thus reliably prevented.

BRIEF DESCRIPTION OF THE DRAWINGS

Other advantages and attainments together with a fuller understanding of the invention will become apparent from the following detailed description and claims when read in conjunction with the accompanying drawings of which:

DESCRIPTION OF THE PREFERRED EMBODIMENTS

A printer according to the preferred embodiments of the present invention is described below with reference to the accompanying figures.

Embodiment 1

A printer according to a first embodiment of the present invention having a peeler mechanism is described below with particular reference to FIG. 1 to FIG. 9.

General Configuration

Figure 1:
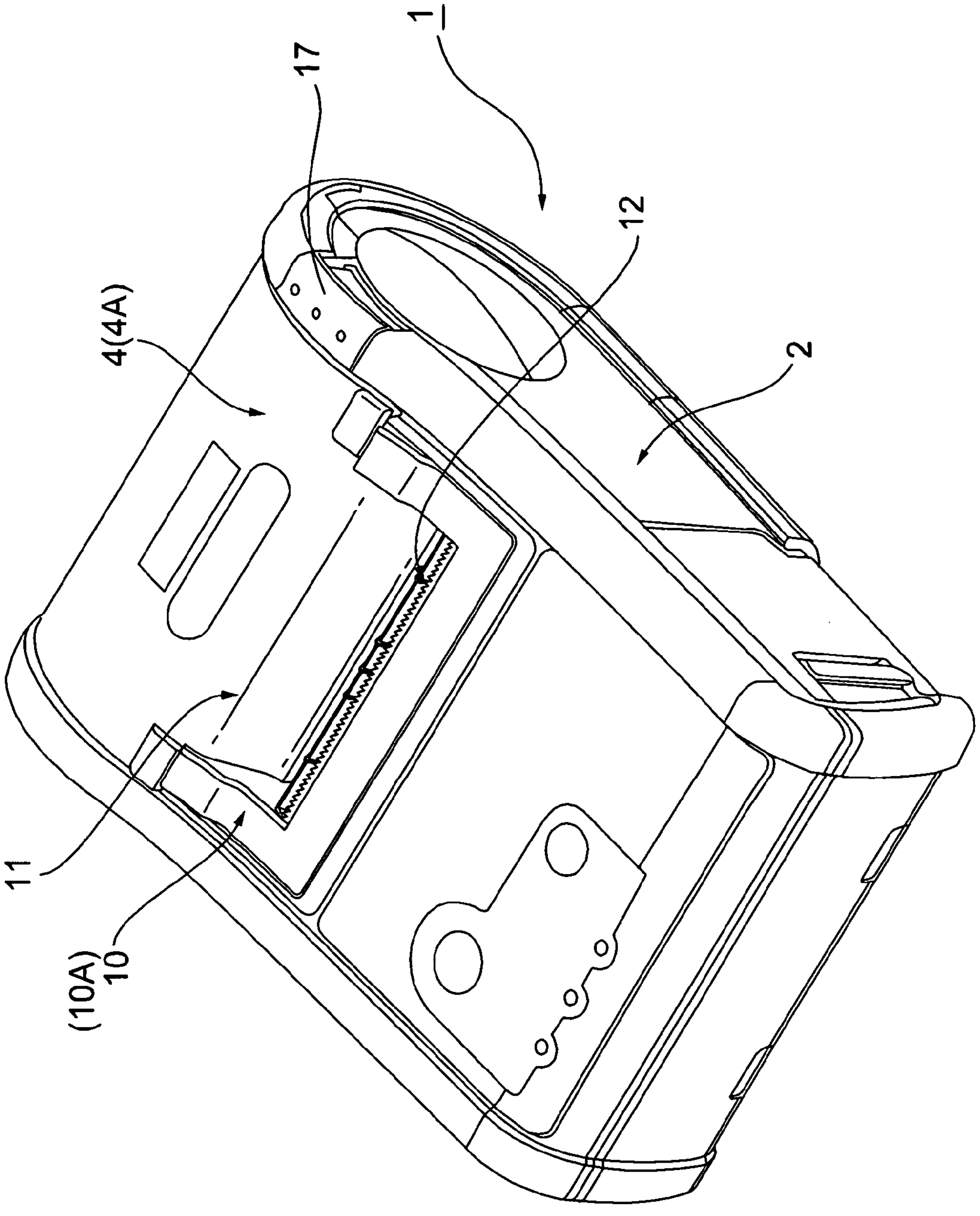
FIG. 1 is an external oblique view of a printer with a peeler mechanism according to the present invention.

A printer with a peeler mechanism 1 according to this embodiment of the invention has a relatively flat, box-like shape as shown in FIG. 1 that is longer from front to back than across the width. An opening/closing cover 4 and an openable peeler unit 10 are disposed at the top rear portion of the printer case 2 of the printer with a peeler mechanism 1. A web exit 11 extending widthwise to the printer is formed between the opening/closing cover 4 and the peeler unit 10. A label exit 12 also extending widthwise to the printer is rendered to the peeler unit 10.

Figure 2:
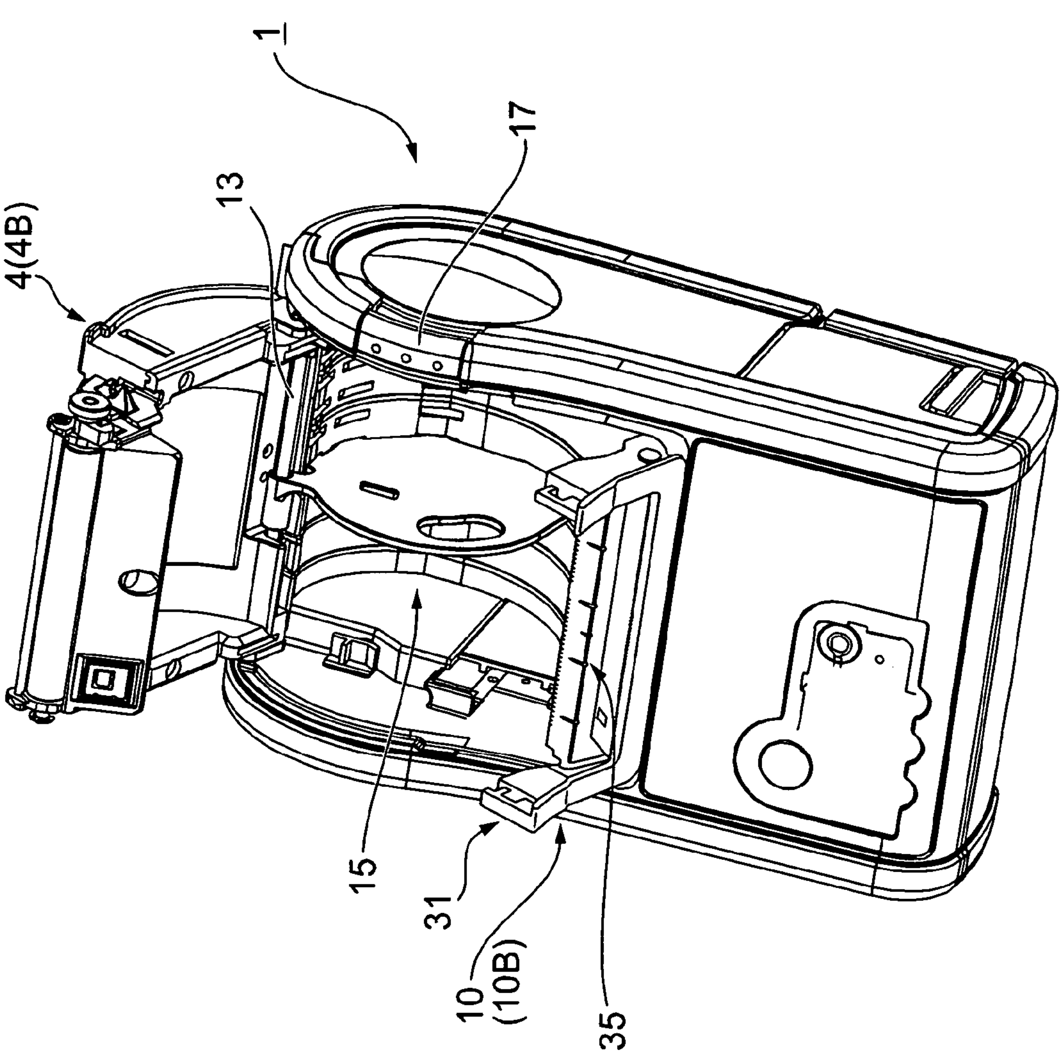
FIG. 2 is an external oblique view showing the printer with a peeler mechanism in FIG. 1 with the opening/closing cover open.

As shown in FIG. 2, the back end part of the opening/closing cover 4 is pivotally supported by a pivot shaft 13 extending widthwise to the printer on the printer body. The opening/closing cover 4 can pivot between the closed position 4A shown in FIG. 1 and FIG. 3 and the open position 4B shown in FIG. 2 and FIG. 4. Opening the opening/closing cover 4 opens the paper compartment 15 formed inside the back part of the printer body.

Figure 3:
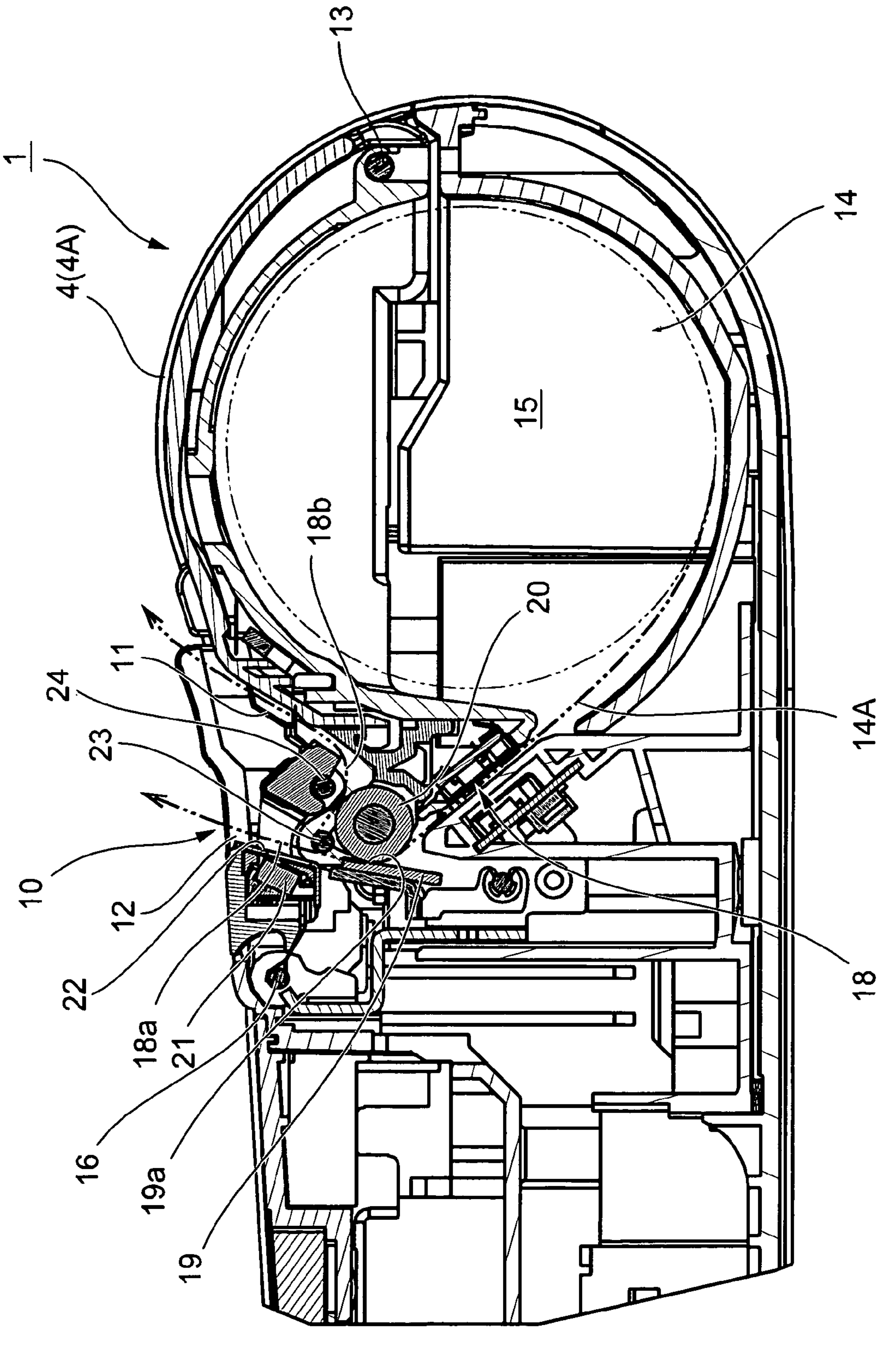
FIG. 3 is a schematic section view showing the medium transportation paths in the printer with a peeler mechanism shown in FIG. 1.
Figure 4:
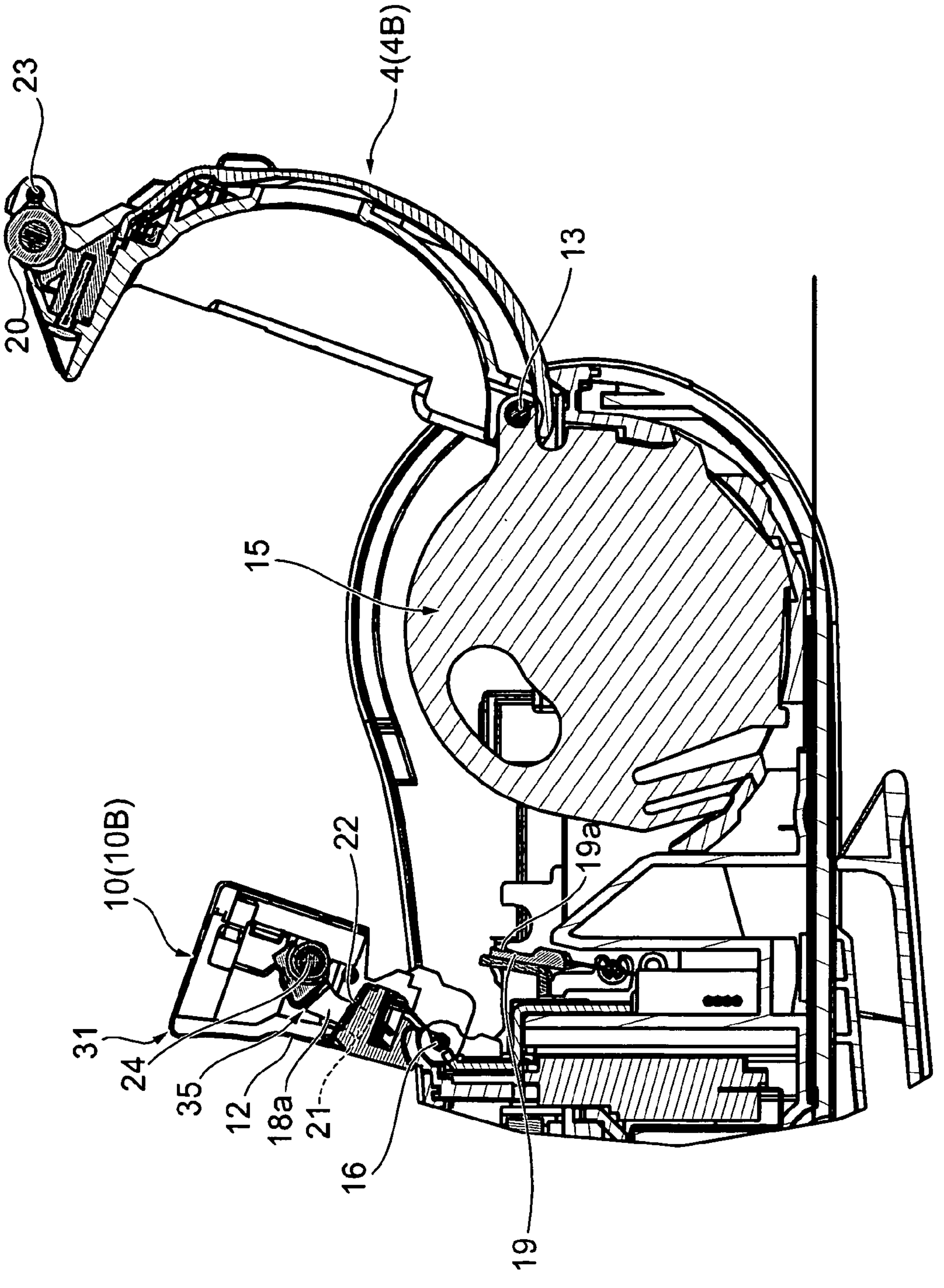
FIG. 4 is a schematic section view showing the medium transportation paths in the printer with a peeler mechanism shown in FIG. 1 with the opening/closing cover open.

As shown in FIG. 4, the peeler unit 10 is similarly pivotally supported at the front end thereof on a pivot shaft 16 disposed to the printer body widthwise to the printer. The peeler unit 10 can thus also swing between the closed position 10A shown in FIG. 1 and FIG. 3 and the open position 10B as shown in FIG. 2 and FIG. 4.

The opening/closing cover 4 and the peeler unit 10 are locked in their respective closed positions 4A and 10A by a lock mechanism not shown.

A cover release button 17 is disposed on the right side of the opening/closing cover 4. Operating this cover release button 17 sequentially unlocks and enables opening the peeler unit 10 and opening/closing cover 4.

As shown in FIG. 3, paper roll 14 is stored in a roll paper compartment 15 formed inside the printer. The paper roll 14 has a length of paper wound into a roll. When the printer is used to print labels, the paper roll 14 is composed of a web backing having labels adhesively affixed thereto at a uniform interval wound into a roll.

As indicated by the double-dot dash line in FIG. 3, a transportation path 18 is rendered inside the printer body for conveying a roll paper 14A delivered from the paper roll 14 held in the paper compartment 15 to the web exit 11 and label exit 12 formed in the top center portion of the printer. A thermal head 19 is disposed in the middle of this transportation path 18. The roll paper 14A passes between a platen roller (a paper feed roller) 20 disposed on the opening/closing cover 4 side and a surface of thermal head 19*a*, and the platen roller 20 and the surface of thermal head 19*a* are pressed together with the roll paper 14A therebetween by means of a specific force (not shown) applied from the back side of the thermal head 19.

When the roll paper 14A is composed of a long web 14*b* and labels 14*c* of a specific length and width adhesively affixed at a constant interval to the surface of the web 14*b*, the thermal head 19 prints on the surface of the labels 14*c* as the roll paper 14A is conveyed by the platen roller 20 as shown and described in FIG. 5B, FIG. 6C, and FIG. 8 below. The printed roll paper 14A is then conveyed through a label discharge path 18*a* leading to the label exit 12 or through a web discharge path 18*b* leading to the web exit 11 and discharged.

A reflective photosensor 21 is disposed to the label discharge path 18*a* as a label detector for detecting if a label 14*c* remains in the label exit 12. In this embodiment of the invention the photosensor 21 is attached to the peeler unit 10. A cutter blade 22 is also disposed to the label discharge path 18*a* for manually cutting the roll paper 14A discharged from the label exit 12 in the continuous label discharge mode. This cutter blade 22 is also rendered to the peeler unit 10. The installation position of the cutter blade 22 is further described below with reference to FIG. 5 to FIG. 7.

A peeler rod 23 is disposed widthwise to the printer at the point where the paper transportation path splits into the label discharge path 18*a* and the web discharge path 18*b*. The peeler rod 23 is a small diameter shaft disposed on the opening/closing cover 4 side of the transportation path that causes the roll paper 14A to curve in an acute angle (an angle of 90 degrees or less) from the label discharge path 18*a* and guides the roll paper 14A. The platen roller 20 is located behind and below the peeler rod 23, and a web pressure roller 24 disposed to the peeler unit 10 side above the platen roller 20 is pressed against and rotates in conjunction with the platen roller 20.

When the roll paper 14A curves around the peeler rod 23, the stiffness of the label 14*c* affixed to the surface of the web 14*b* causes the label 14*c* to separate and peel off the web 14*b* (the label 14*c* proceeding straight). The peeled label 14*c* then travels through the label discharge path 18*a* to the label exit 12 while the web 14*b* is held between the platen roller 20 and the web pressure roller 24 and is conveyed thereby through the web discharge path 18*b* to the web exit 11. The web pressure roller 24 disposed on the peeler unit 10 and the peeler rod 23 disposed to the printer body side thus form mainly members of a peeler 30 in this embodiment of the invention.

Pushing on the cover release button 17 to release the lock mechanism not shown and open the peeler unit 10 causes the web pressure roller 24 of the peeler unit 10 to separate from the surface of the platen roller 20 and opens the web discharge path 18*b* communicating with the web exit 11. Opening the peeler unit 10 also enables opening the opening/closing cover 4. Opening the opening/closing cover 4 separates the platen roller 20 disposed to the opening/closing cover 4 from the thermal head 19 and thus opens the transportation path 18. A new paper roll 14 can then be loaded into the paper compartment 15, the leader of the roll paper 14A is pulled out, and the opening/closing cover 4 and then the peeler unit 10 are closed. This locates the roll paper 14A between the thermal head 19 and platen roller 20, and leaves the roll paper 14A exposed from the label exit 12 or web exit 11.

Peeler Mechanism

The arrangement of the peeler 30 according to this embodiment of the invention is described next with reference to FIG. 5A, FIG. 5B, and FIG. 6A to FIG. 6C. FIG. 5A is an oblique view and FIG. 5B is a section view of the peeler unit 10 when switched to the operating position for peeling labels. FIG. 6A is an oblique view, FIG. 6B is an oblique view of part, and FIG. 6C is a section view of the peeler unit when set to the retracted position for discharging the web without peeling the labels.

The peeler unit 10 has a unit frame 31 and the web pressure roller support frame 35 (pivot member). The unit frame 31 can swing up and down around a pivot shaft 16 on the printer body side. The web pressure roller support frame 35 supports the web pressure roller 24, and is supported by the unit frame 31 so that the web pressure roller support frame 35 can pivot up and down.

Figure 5B:
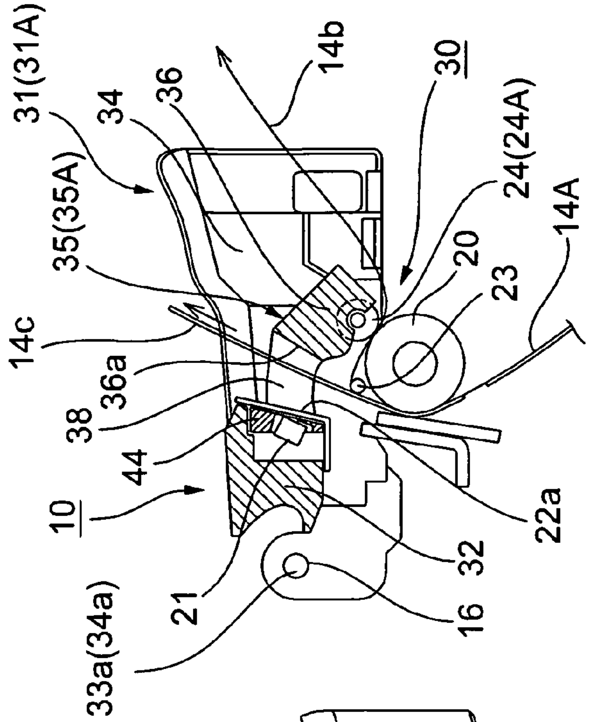
FIG. 5A and FIG. 5B are an oblique view and a schematic section view of the peeler mechanism in the printer shown in FIG. 1 when set to the operating position.
Figure 5A:
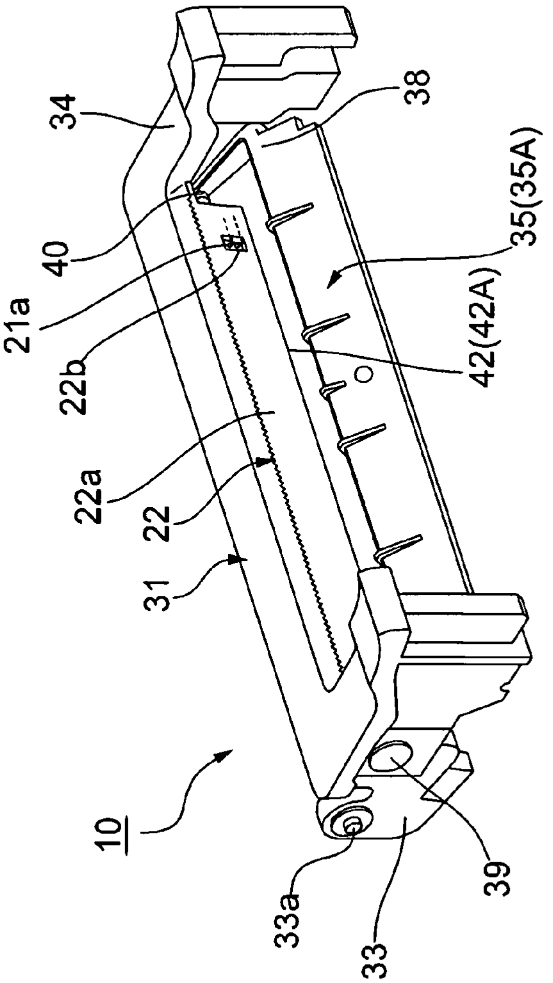
Figure 6A:
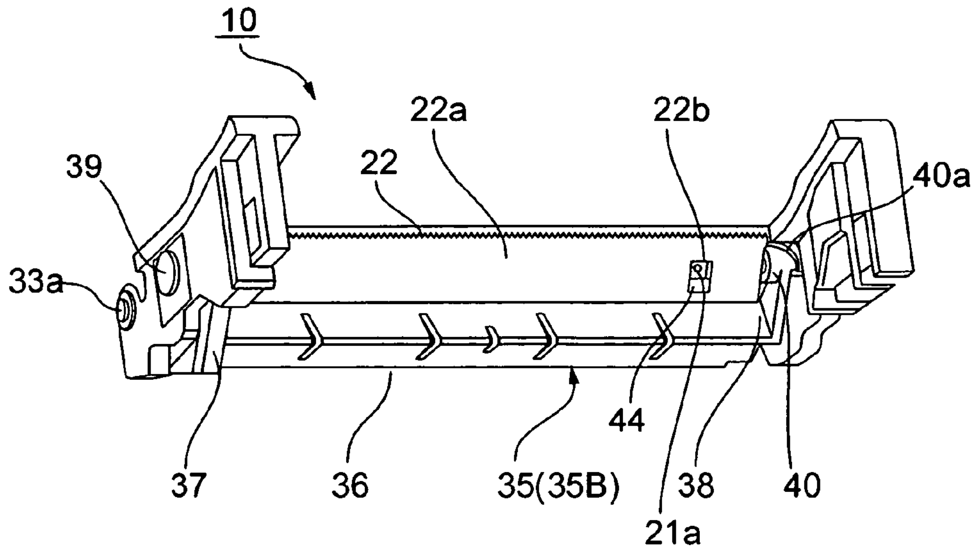
FIG. 6A, FIG. 6B, and FIG. 6C are an oblique view, a partial oblique view, and a schematic section view of the peeler when set to the retracted position in the printer with a peeler mechanism shown in FIG. 1.

When the peeler unit 10 is closed with the web pressure roller support frame 35 set to the upper or the first pivot position 35A as shown in FIG. 5A and FIG. 5B, the web pressure roller 24 is set to the web pressure position 24A in which the web pressure roller 24 presses the roll paper 14A from above against the platen roller 20. This is the position in which the web 14*b* part of the roll paper 14A can be conveyed around the peeler rod 23 and discharged from the web exit 11, that is, the position in which the peeler works to peel the labels from the web.

Figure 6B:
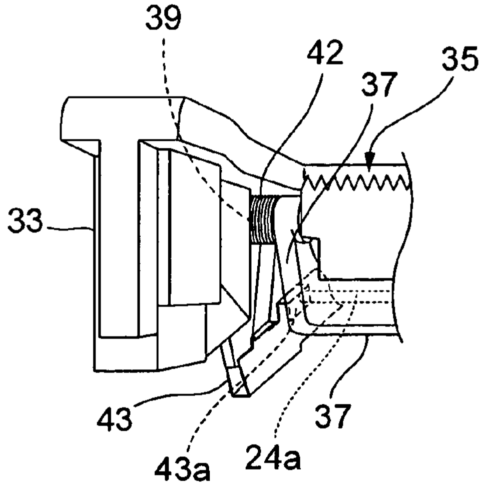
Figure 6C:
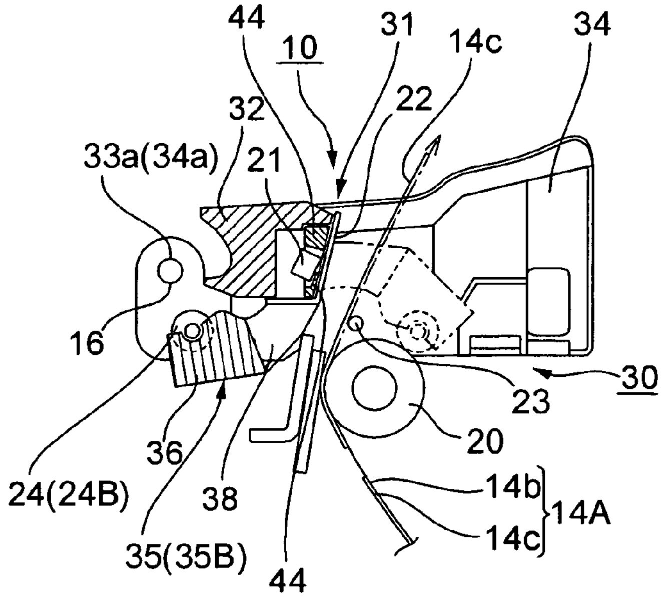

If the peeler unit 10 is closed with the web pressure roller support frame 35 set to the lower or second pivot position 35B as shown in FIG. 6A, FIG. 6B, and FIG. 6C, the web pressure roller 24 is set to the retracted position 24B removed to a position in front of the platen roller 20 and thus does not push against the platen roller 20. This is the retracted position of the peeler 30 in which the web 14*b* portion of the roll paper 14A is not conveyed around the peeler rod 23 and discharged from the web exit 11 and labels 14*c* are thus not peeled from the web 14*b*.

The peeler 30 can thus be easily set to the retracted, non-peeling, position by rotating the web pressure roller support frame 35 from the first pivot position 35A to the second pivot position 35B while the peeler unit 10 is open as shown in FIG. 2 and FIG. 4, and then simply closing the peeler unit 10.

The parts of the peeler unit 10 are described in detail next below.

The unit frame 31, which can pivot up and down as noted above, has a connecting portion 32 extending widthwise to the printer, and left and right arm portions 34, 33 bending at a right angle from opposite ends of the connecting portion 32 and extending toward the back of the printer. A shaft hole 33*a*, 34*a* is formed in the front end part of each arm portion 33, 34. Pivot shaft 16 rendered on the printer body side passes freely rotatably through the shaft holes 33*a*, 34*a* so that the unit frame 31 can pivot vertically open and closed on pivot shaft 16. The unit frame 31 is constantly urged upward (in the opening direction) by a torsion spring (not shown in the figure) attached to the pivot shaft 16.

The web pressure roller support frame 35 is attached between the left and right arm portions 34, 33 of the unit frame 31 so that the web pressure roller support frame 35 can pivot up and down. The web pressure roller support frame 35 has a connecting portion 36 extending widthwise to the printer, and left and right arm portions 38, 37 bending at a right angle from the ends of the connecting portion 36 and extending toward the back of the printer. The web pressure roller 24 is rendered freely rotatably below the connecting portion 36. Trunnions 40, 39 protrude to the outside widthwise to the printer at the ends of the left and right arm portions 38, 37 toward the back of the printer, and the trunnions 40, 39 are freely rotatably attached to the left and right arm portions 34, 33 of the unit frame 31.

The cutter blade 22 is attached to the surface of the connecting portion 32 of the unit frame 31 extending widthwise to the printer. The surface of the cutter blade 22 is label guide surface 22*a*. The surface of the connecting portion 36 of the web pressure roller support frame 35 is also a label guide surface 36*a*. When the web pressure roller support frame 35 is in the first pivot position 35A, label guide surface 22*a* opposes label guide surface 36*a* with a specific gap therebetween in the front-back direction of the printer, and these guide surfaces define the label discharge path 18*a* and the label exit 12.

As will be known from FIG. 6B, a torsion spring 42 is disposed to the trunnion 39 and one end of the torsion spring 42 urges the web pressure roller support frame 35 upward to the first pivot position 35A. The other end of the torsion spring 42 is connected to a lock plate 43 that is attached at a position below the arm portion 37 so that the lock plate 43 can move up and down, and the torsion spring 42 urges the lock plate 43 upward. The lock plate 43 is thus attached so that the lock plate 43 can move up (unlock to a lock member of the arm portion 37 (not shown)) and down (lock to a lock member of the arm portion 37 (not shown)) relative to arm portion 37.

When the web pressure roller support frame 35 swings to the second pivot position 35B, the end of the roller shaft 24*a* of the web pressure roller 24 supported on the web pressure roller support frame 35 pushes up on a hook 43*a* in the lock plate 43 and is locked behind the web pressure roller support frame 35. The web pressure roller support frame 35 is thus locked in the second pivot position 35B, and the web pressure roller 24 supported by the web pressure roller support frame 35 is set to the retracted position 24B. If the lock plate 43 is pushed up against the force of the spring from this locked position, the end of the roller shaft 24*a* of the web pressure roller 24 separates from the hook 43*a* in the lock plate 43. As a result, the web pressure roller support frame 35 is returned by the force of the torsion spring 42 to the first pivot position 35A. The web pressure roller support frame 35 can thus move between the first pivot position 35A and second pivot position 35B.

A rectangular window 22*b* is rendered in the right end part of the cutter blade 22 attached to the connecting portion 32 of the unit frame 31, and the emitter/receptor surface 21*a* of the reflective photosensor 21 used for label detection is exposed through this window 22*b*. A substantially rectangular shield plate 44 is attached slidably widthwise to the printer behind the cutter blade 22.

Figure 7A:
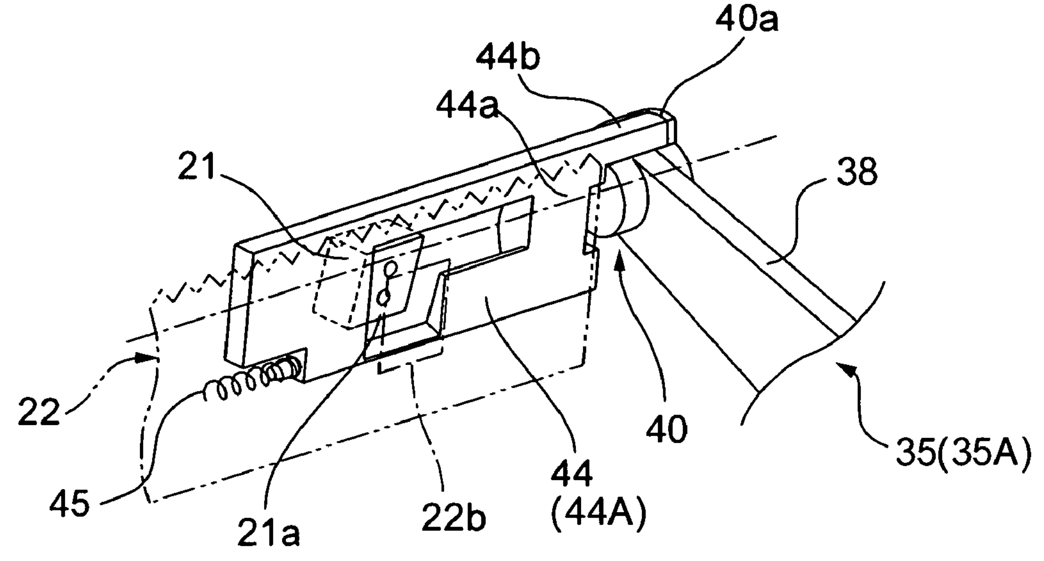
FIG. 7A and FIG. 7B describe the cam mechanism for moving the shield plate of the peeler mechanism shown in FIG. 1.
Figure 7B:
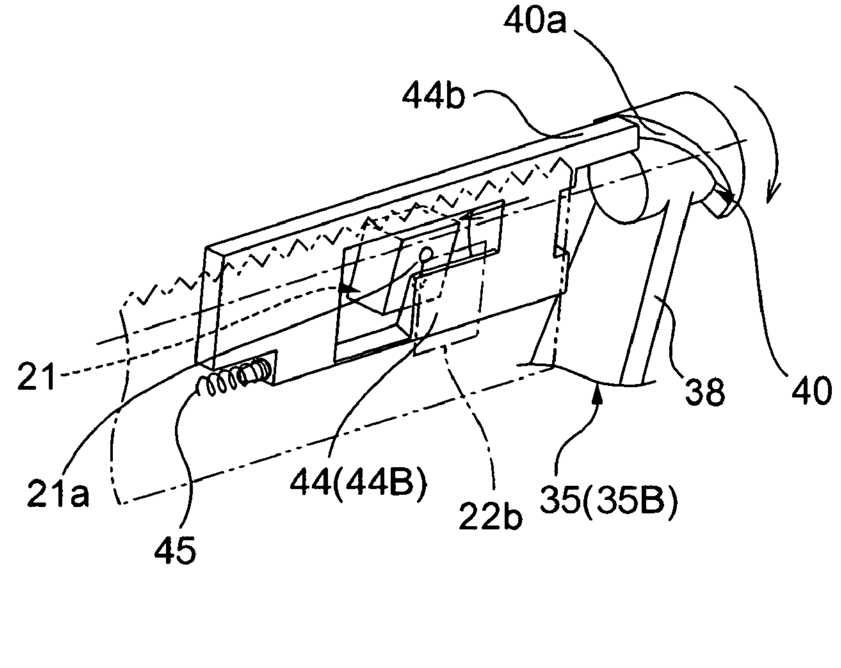

FIG. 7A and FIG. 7B describe the cam mechanism for sliding the shield plate 44. As shown in these figures, arm 44*a* extends from the right end part of the shield plate 44 toward the trunnion 40 of the right arm portion 38 of the web pressure roller support frame 35, and cam follower 44*b* is formed on the distal end of this arm 44*a*. A spiral cam face 40*a* is rendered on the circular outside surface of the trunnion 40, and the force of a spring 45 pushes the cam follower 44*b* freely slidably against this cam face 40*a*. The cam mechanism composed of this cam face 40*a* and the cam follower 44*b* causes the shield plate 44 to slide from the open position 44A shown in FIG. 7A to the shield position 44B shown in FIG. 7B in conjunction with the web pressure roller support frame 35 rotating from the first pivot position 35A to the second pivot position 35B.

When in the open position 44A, the shield plate 44 is positioned beside the window 22*b* through which the emitter/receptor surface 21*a* of the photosensor 21 is exposed, and the photosensor 21 can detect the reflected detection light (infrared ray) through the window 22*b* as shown in FIG. 5A.

When the shield plate 44 then slides to the cam follower 44*b*, the bottom part of the window 22*b* is covered by the shield plate 44 as shown in FIG. 6A. As a result, the part of the photoreceptor surface of the emitter/receptor surface 21*a* of the photosensor 21 is covered. The photosensor 21 is thus unable to receive the reflected detection light through the window 22*b*, and is thus held continuously in the output state indicating that no label is present.

Note that the photosensor 21 in this embodiment of the invention is rendered with the emitter/receptor surface 21*a* pointing downward relative to the vertical as shown in FIG. 5B and FIG. 6C. Thus orienting the photosensor 21 prevents outside light from entering through the label exit 12, for example, being picked up by the emitter/receptor surface 21*a*, and causing detection errors by the photosensor 21.

Drive Control System

Figure 8:
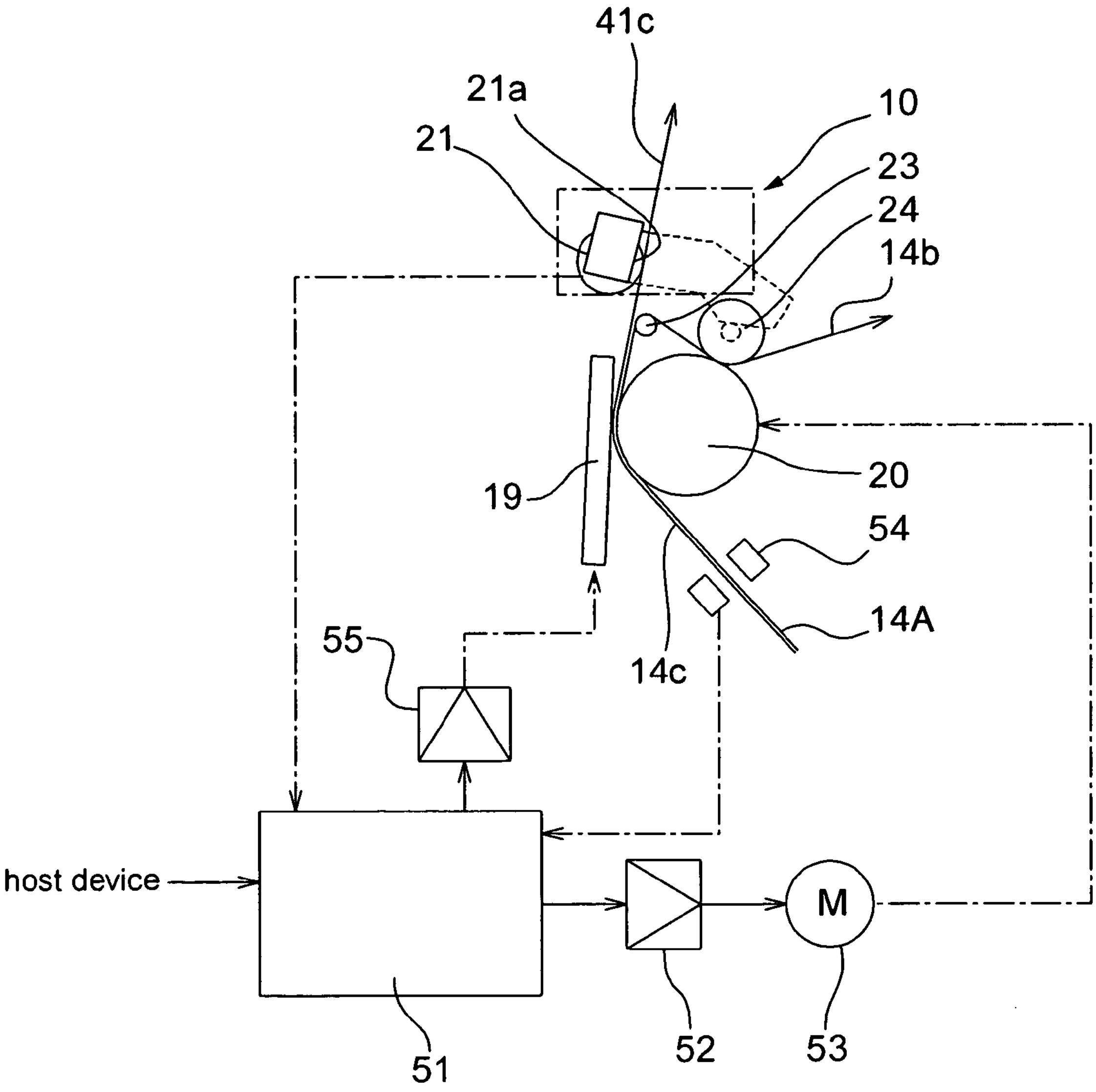
FIG. 8 is a block diagram showing the control system of the printer with a peeler mechanism shown in FIG. 1.

FIG. 8 is a schematic block diagram of the drive control system of a printer with a peeler mechanism 1 according to the present invention. This drive control system has a drive control unit 51 composed of a microprocessor, for example. A data processing terminal or host device supplies printing commands and printing data to the drive control unit 51. When such printing commands are received, the drive control unit 51 determines from the output of the photosensor 21 whether the operating mode is set to the label peeling mode or the continuous label output mode (i.e., non-peeling mode). The drive control unit 51 then controls the motor driver 52 to drive the drive motor 53 (paper transportation mechanism) of the platen roller 20 to convey the roll paper 14A according to the selected operating mode. Synchronized to the paper transportation operation, the drive control unit 51 also drives the thermal head 19 by way of head driver 55 to print a label. The presence of roll paper 14A and the position of the label 14*c* are recognized during roll paper 14A transportation based on the detection signal output by the paper detection sensor 54 located downstream (the transportation path 18) from the platen roller 20.

Label Dispensing Operation

Figure 9:
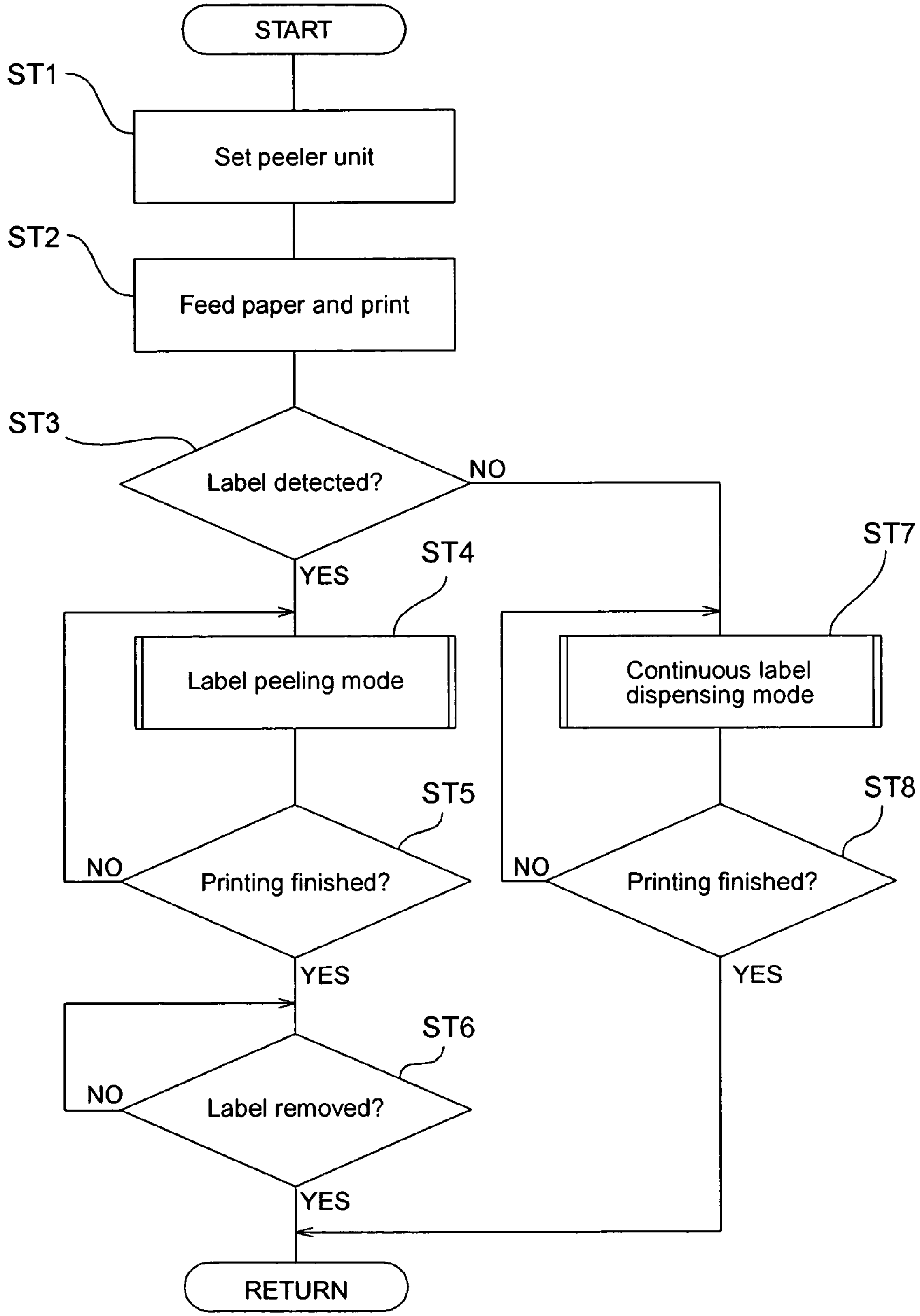
FIG. 9 is a flow chart describing the operation of a printer with a peeler mechanism shown in FIG. 1.

FIG. 9 is a flow chart of the label dispensing operation of this printer with a peeler mechanism 1. The label dispensing operation and operation of the peeler 30 are described next with reference to this flow chart.

Labels can be dispensed in either of two operating modes, a label peeling mode in which the labels are peeled and dispensed one at a time, and a continuous label dispensing mode in which multiple labels are issued continuously intact on the web, that is, without being peeled from the web. In either case, roll paper 14A having labels 14*c* of a specific length adhesively affixed at a constant interval on a long web 14*b* backer wound into a roll is loaded in the paper compartment 15 as the paper roll 14.

In the label peeling mode in which the labels 14*c* are peeled and dispensed one at a time, the web pressure roller support frame 35 of the peeler unit 10 is set to the first pivot position 35A and the peeler unit 10 is then closed (step ST1 in FIG. 9). This routes the roll paper 14A as shown in FIG. 5A and FIG. 5B curving down around the top surface of the peeler rod 23 and between the web pressure roller 24 and platen roller 20 with the leading end of the roll passing out from the web exit 11.

When a print label command is then received, transporting the roll paper 14A starts and the first label is printed (FIG. 9, step ST2). The web 14*b* is discharged from the web exit 11, but the stiffness of each label 14*c* on the web 14*b* causes the label 14*c* to separate (peel off) from the web 14*b* at the peeler rod 23 instead of curving around the peeler rod 23 with the web 14*b* (the label 14*c* proceeding straight). The label 14*c* thus peels away from the surface of the web 14*b*, travels upward through the label discharge path 18*a*, and is discharged from the label exit 12.

The emitter/receptor surface 21*a* of the label detection photosensor 21 is exposed at the label guide surface 22*a* at the front side of the printer defining the label discharge path 18*a*. When a peeled label 14*c* reaches the label exit 12, the peeled label 14*c* is detected by the photosensor 21.

If the roll paper 14A has advanced a certain distance in the label printing operation starts and the output from the label detection photosensor 21 changes to indicate that a label was detected, the drive control unit 51 knows that the peeler 30 is set to operate in the label peeling mode. The label dispensing mode is therefore set to the label peeling mode (FIG. 9, step ST3 returns yes and goes to ST4).

Conveyance of the roll paper 14A then stops after the label 14*c* is advanced to a position where the label 14*c* can be removed, and operation then pauses. When the operator has removed the label 14*c*, the label detection photosensor 21 output returns to the no-label output state. When the roll paper 14A has advanced to the position where the label 14*c* can be removed, the leading edge of the next label is beyond (downstream of) the printing position of the thermal head 19. The operation for printing and dispensing the next label therefore starts by reversing the roll paper 14A to return the leading edge of the next label to the printing position of the thermal head 19, and then printing the next label (FIG. 9, step ST5 and step ST6). This operation repeats to print and dispense the labels one by one. If a printing data for the next label is not received from the host device, the printer remains in a standby mode waiting for the next printing operation.

Operation in the continuous label dispensing mode for issuing a continuous series of labels 14*c* intact on the web is described next.

To operate in the continuous label dispensing mode the peeler unit 10 is opened, the web pressure roller support frame 35 is set to the second pivot position 35B, and the peeler unit 10 is then closed. This loads the roll paper 14A as shown in FIG. 6A to FIG. 6C so that the roll paper 14A does not pass around the peeler rod 23 and straight travels upward along the label guide surface 22*a* (FIG. 9, step ST1).

When the web pressure roller support frame 35 is set to the second pivot position 35B, the shield plate 44 of the label guide surface 22*a* slides from open position 44A to the shield position 44B, thus covering the lower portion of the window 22*b* through which the emitter/receptor surface 21*a* of the label detection photosensor 21 is exposed. The photoreceptor in the lower portion of the emitter/receptor surface 21*a* of the label detection photosensor 21 is thus covered and therefore cannot detect the detector light reflected from the roll paper 14A. As a result, the label detection photosensor 21 is held continuously in the no-label output state.

When a print label data is then received, conveying the roll paper 14A starts and the first label is printed (FIG. 9, step ST2). Because the peeler 30 does not function in this continuous label dispensing mode, the label 14*c* is discharged intact on the web 14*b*.

In this mode the output from the label detection photosensor 21 does not change to the label-detected state when the roll paper 14A is advanced the aforementioned specific distance in the label printing operation starts. The drive control unit 51 thus knows that the peeler 30 is set to the retracted position because the output of the label detection photosensor 21 is held in the no-label state. The label dispensing operation therefore continues in the continuous label dispensing mode (FIG. 9, step ST3 returns NO and operation goes to step ST7).

Printing the labels 14*c* on the web 14*b* thereafter continues uninterrupted based on the label printing data received from the host device as the roll paper 14A is conveyed continuously without interruption. The printed labels 14*c* are thus discharged continuously intact on the web 14*b*. When printing then stops (FIG. 9, step ST8), the printer resumes the standby mode waiting for the next printing data.

It will also be obvious that to print on a standard paper roll 14 (not the label paper) having paper wound in a roll the web pressure roller support frame 35 is set to the second pivot position 35B so that the paper is routed up passed the label guide surface 22*a*. The printed paper is thus discharged continuously in the same way as when dispensing a continuous series of labels as described above.

It will thus be apparent that when the peeler 30 is set to the retracted position in a printer with a peeler mechanism 1 according to this embodiment of the invention, the shield plate 44 moves therewith to the position covering the photoreceptor in the emitter/receptor surface 21*a* of the label detection photosensor 21. The label detection photosensor 21 therefore outputs continuously in the no-label detection state when a label 14*c* is discharged and will not change to the label-detected output state.

A web sensor or other sensor for detecting a change in the operating mode is therefore not needed, the position of the peeler 30 can be recognized using the label detection photosensor 21, and the operating mode can be controlled based on label detection photosensor 21 output. A change in the operating mode can thus be detected without incurring an increase in cost or size, and an operating mode switching operation is not needed. Furthermore, because the operating position of the peeler 30 and the operating mode recognized by the printer always match, problems such as the operator setting the wrong mode and labels becoming jammed in the label exit are avoided.

A reflection type photosensor 21 is used as the label detection means in this embodiment of the invention, but a transmission type photosensor having the emitter and receptor in opposed positions could be used instead.

Furthermore, the shield plate 44 covers only the photoreceptor portion of the emitter/receptor surface 21*a* of the reflective photosensor 21 in this embodiment of the invention, but the shield plate 44 could be rendered to cover all of the emitter/receptor surface 21*a*. Further alternatively, the shield plate 44 could be rendered to cover all of the label detection photosensor 21.

A cam mechanism is used to slide the shield plate 44 in this embodiment of the invention, but it will also be obvious that a linkage mechanism other than a cam mechanism could be used to move the shield plate 44 instead. Yet further, movement of the shield plate 44 shall not be limited to a linear path, and the shield plate could be rendered to move between the open position and shield position along a spiral path, circular path, or other path. The shield plate could even be rendered to open and close in a manner similar to the shutter mechanism or iris mechanism of a camera.

Embodiment 2

A printer with a peeler mechanism according to a second embodiment of the invention is described next with reference to FIG. 10 to FIG. 15.

General Configuration

Figure 10:
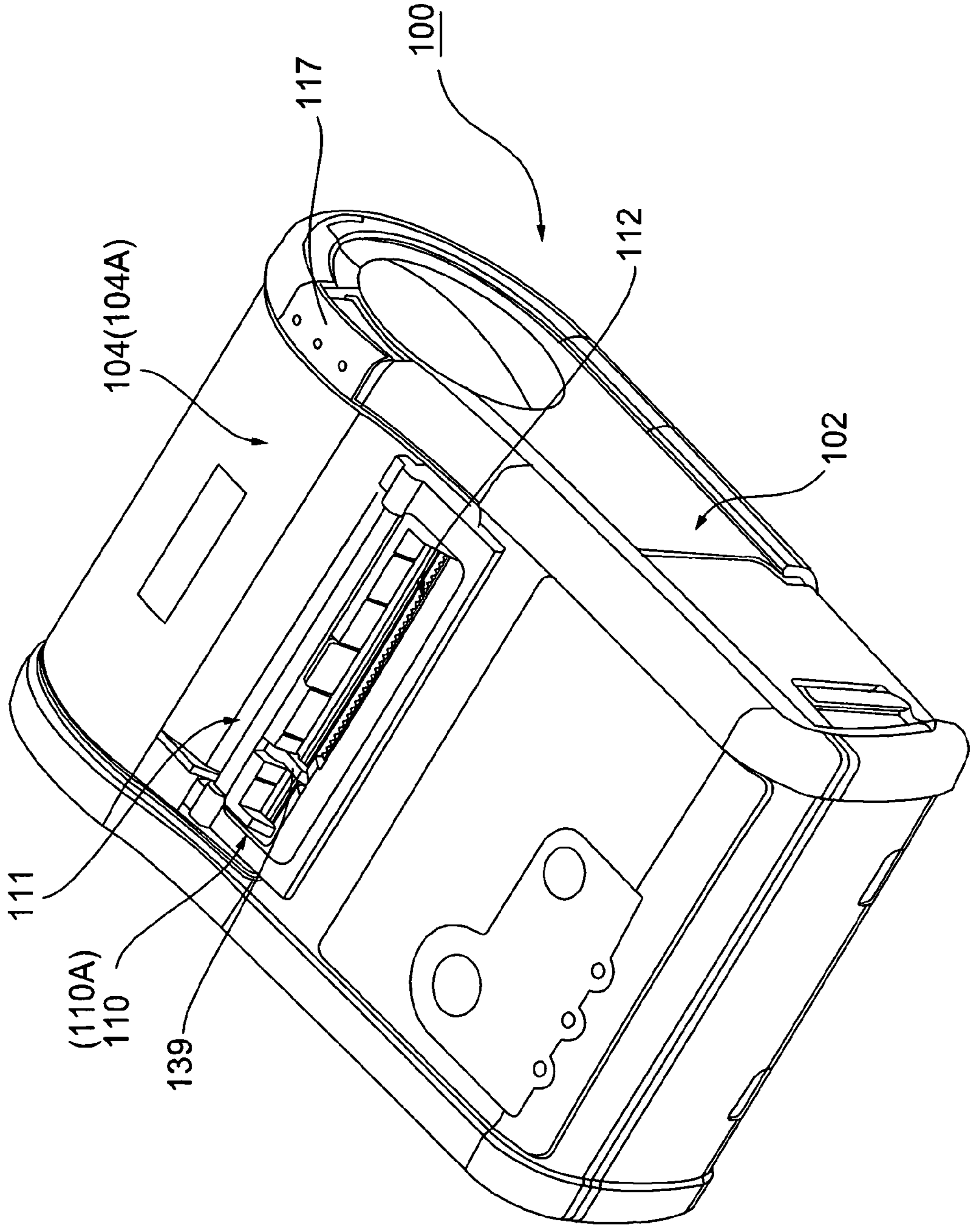
FIG. 10 is an external oblique view of a printer with a peeler mechanism according to a second embodiment of the present invention.
Figure 11:
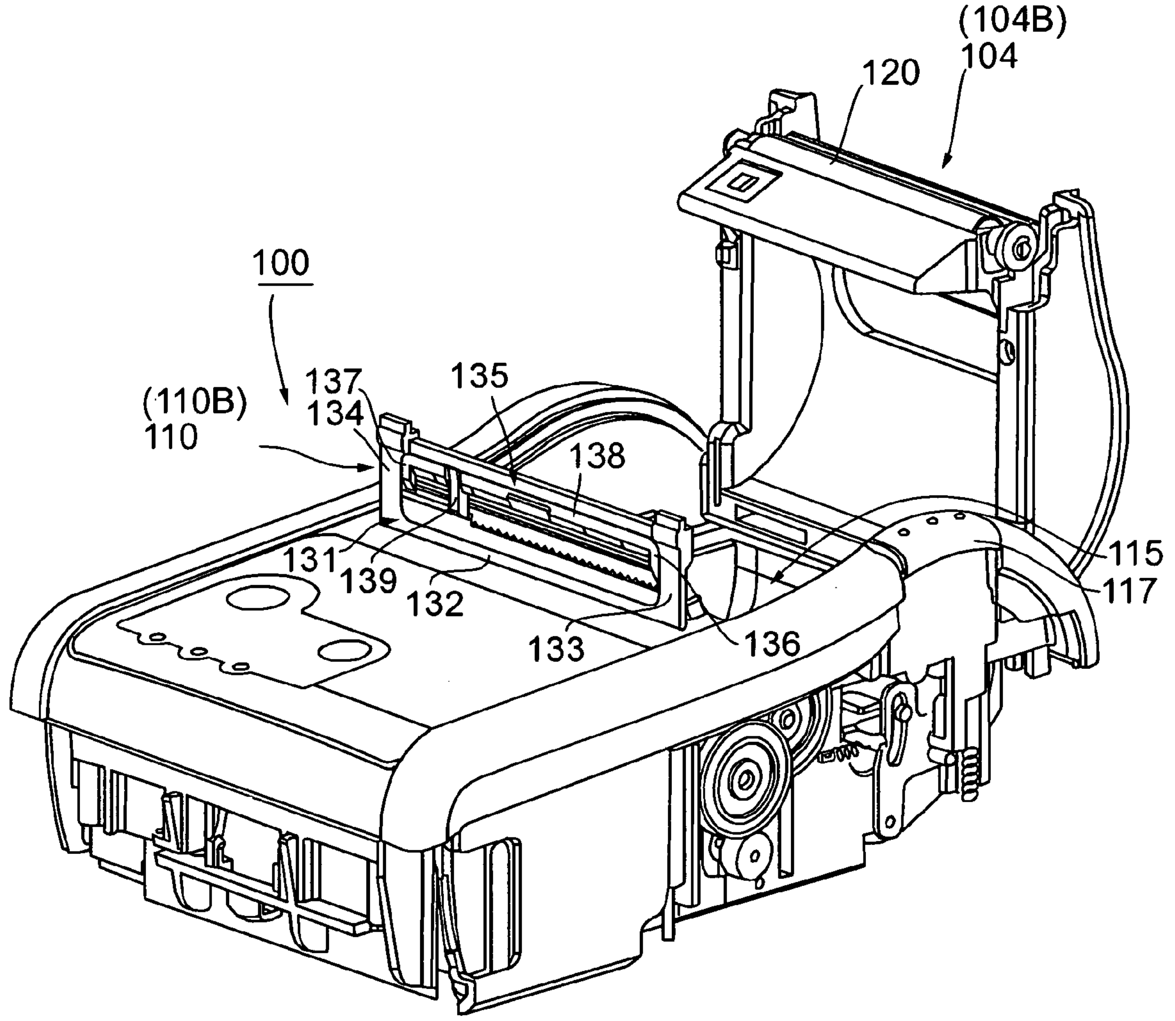
FIG. 11 is an external oblique view showing the opening/closing cover of the printer shown in FIG. 10 open.
Figure 12:
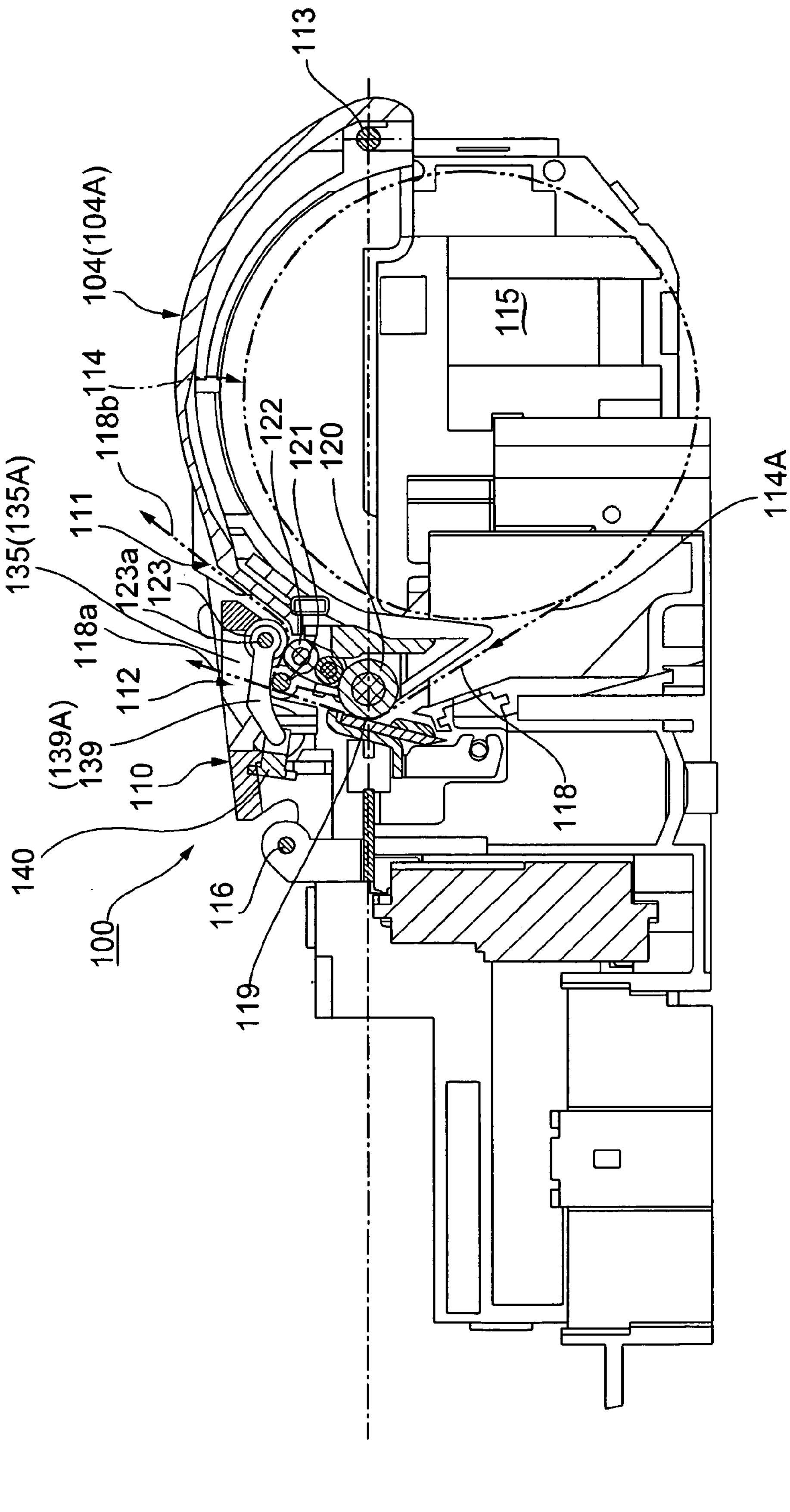
FIG. 12 is a schematic section view showing the recording medium transportation path in the printer shown in FIG. 10.

FIG. 10 is an oblique view showing a printer with a peeler mechanism according to this embodiment of the invention, FIG. 11 is an oblique view showing the printer with the opening/closing cover open and the bottom part of the printer case removed, and FIG. 12 is a section view showing the transportation paths for the recording medium (a roll paper, a label and a web). The general arrangement of a printer with a peeler mechanism according to this embodiment of the invention is described below with reference to these figures.

The basic arrangement of a printer with a peeler mechanism 100 according to this embodiment of the invention is the same as the printer with a peeler mechanism 1 according to the first embodiment, and as shown in FIG. 10 has a relatively flat, box-like shape that is longer from front to back than across the width. An opening/closing cover 104 and an openable peeler unit 110 are disposed at the top rear portion of the printer case 102 of the printer with a peeler mechanism 100. A web exit 111 extending widthwise to the printer is formed between the opening/closing cover 104 and the peeler unit 110. A label exit 112 also extending widthwise to the printer is rendered to the peeler unit 110.

As shown in FIG. 11, the back end part of the opening/closing cover 104 is pivotally supported by a pivot shaft 113 extending widthwise to the printer on the printer body. The opening/closing cover 104 can pivot between the closed position 104A shown in FIG. 10 and the open position 104B shown in FIG. 11. Opening the opening/closing cover 104 opens the roll paper compartment 114 formed inside the back part of the printer body.

The peeler unit 110 is similarly pivotally supported at the front end thereof on a pivot shaft 116 disposed to the printer body widthwise to the printer. The peeler unit 110 can thus also swing between the closed position 110A shown in FIG. 10 and the open position 110B as shown in FIG. 11.

The opening/closing cover 104 and the peeler unit 110 are locked in their respective closed positions 104A and 110A by a lock mechanism not shown.

A cover release button 117 is disposed on the right side of the opening/closing cover 104. Operating this cover release button 117 unlocks and enables opening the peeler unit 110 and opening/closing cover 104.

As shown in FIG. 12, paper roll 115 is stored in a roll paper compartment 114 formed inside the printer. The paper roll 115 has a length of paper wound into a roll. When the printer is used to print labels, the paper roll 115 is composed of a web backing having labels adhesively affixed thereto at a uniform interval wound into a roll.

As indicated by the double-dot dash line in FIG. 12, a transportation path 118 is rendered inside the printer body for conveying a roll paper 114A delivered from the paper roll 115 held in the roll paper compartment 114 to the web exit 111 and label exit 112 formed in the top center portion of the printer. A thermal head 119 is disposed in the middle of this transportation path 118. The roll paper 114A passes between the thermal head 119 and a platen roller 120 disposed on the opening/closing cover 104 side, and the thermal head 119 and platen roller 120 are pressed together with the roll paper 114A therebetween by means of specific force (not shown) applied from the back side of the thermal head 119.

When the roll paper 114A is composed of a long web 114*b* and labels 114*c* of a specific length and width adhesively affixed at a constant interval to the surface of the web 114*b*, the thermal head 119 prints on the surface of the labels 114*c* as the roll paper 114A is conveyed by the platen roller 120 as shown and described in FIG. 13 to FIG. 15 below. The printed roll paper 114A is then conveyed through a label discharge path 118*a* leading to the label exit 112 or through a web discharge path 118*b* leading to the web exit 111 and discharged.

A label detection unit composed of a label detection lever 139 and a photocoupler 140 for detecting whether a label remains in the label exit 112 is disposed to the label discharge path 118*a*. This label detection unit is disposed to the peeler unit 110 in this embodiment of the invention.

A peeler roller 121 is disposed to the web discharge path 118*b* leading to the web exit 111 to bend the roll paper 114A at an angle of at least 90 degrees or less to the back of the printer. A web transportation roller 122 assembled to the printer body is disposed behind the peeler roller 121. A web pressure roller 123 disposed to the peeler unit 110 is pressed against and rotates in conjunction with the web transportation roller 122, and the web 114*b* can thus be held between the web transportation roller 122 and the pressure roller 123. The web transportation roller 122 turns synchronized with the platen roller 120.

The openable peeler unit 110 (with the web pressure roller 123), the peeler roller 121 and the web transportation roller 122 form the peeler mechanism 130. Opening the peeler unit 110 separates the pressure roller 123 disposed to the peeler unit 110 from the web transportation roller 122, and thus opens the web discharge path 118*b* guiding the web 114*b* to the web exit 111. Opening the opening/closing cover 104 likewise separates the platen roller 120 attached thereto from the thermal head 119, and thus opens the transportation path 118. When the paper roll 115 is replaced, the new paper roll 115 is loaded after opening the opening/closing cover 104, the leader of the roll paper 114A is pulled out, the opening/closing cover 104 is closed, and then the peeler unit 110 is closed. This loads the roll paper 114A between the thermal head 119 and the platen roller 120 with the leader passing out through either the label exit 112 or the web exit 111.

Peeler Mechanism

The arrangement of the peeler mechanism 130 is described next in detail below with reference to FIG. 13 to FIG. 15. FIG. 13 and FIG. 14 are section views of the peeler mechanism 130 when set to operate in the label peeling mode, and FIG. 15 is a section view of the peeler mechanism 130 set to operate in the continuous label dispensing mode in which the labels are not peeled from the web.

The peeler unit 110 has a unit frame 131 and the web pressure roller support frame 135 (pivot member). The unit frame 131 can swing up and down around a pivot shaft 116 on the printer body side. The web pressure roller support frame 135 supports the web pressure roller 123, and is supported by the unit frame 131 so that the web pressure roller support frame 135 can pivot up and down.

Figure 13:
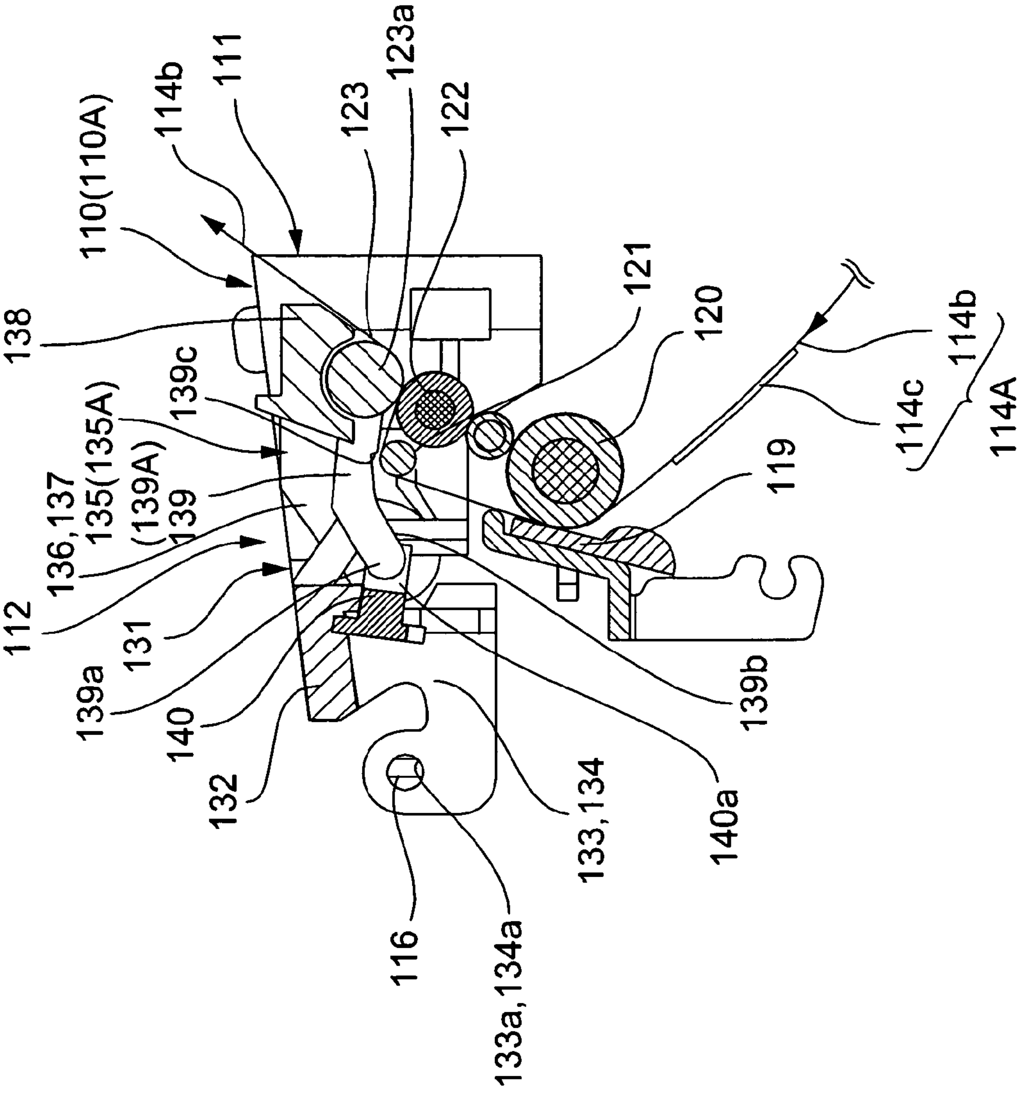
FIG. 13 describes the operation of the peeler mechanism shown in FIG. 10.
Figure 14:
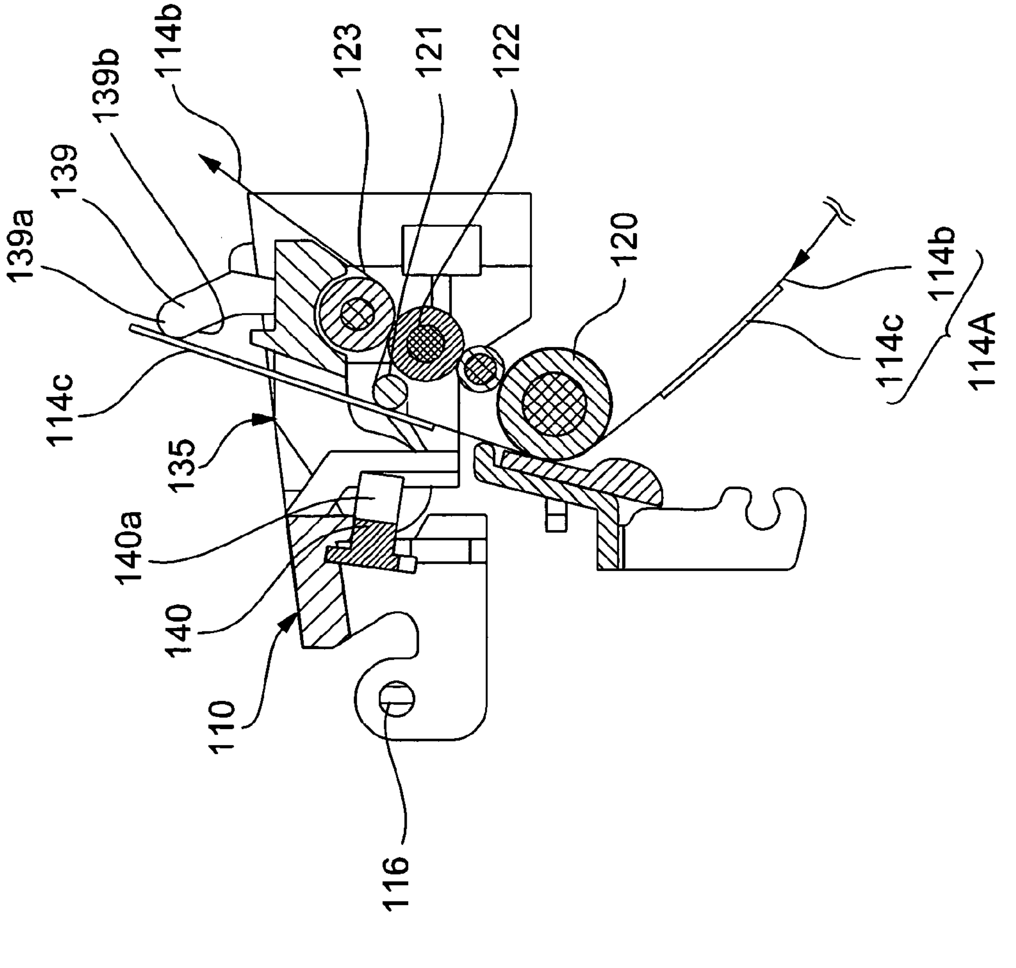
FIG. 14 describes the operation of the peeler mechanism shown in FIG. 10 when the label detection lever is raised.

When the peeler unit 110 is closed with the web pressure roller support frame 135 set to the upper or the first pivot position 135A as shown in FIG. 13 and FIG. 14, the web pressure roller 123 is set to the web pressure position 123A in which the web pressure roller 123 presses the roll paper 114A from above against the web transportation roller 122. This is the position in which the web 114*b* part of the roll paper 114A can be conveyed around the peeler roller 121 and discharged from the web exit 111, that is, the position in which the peeler mechanism 130 works to peel the labels from the web.

Figure 15:
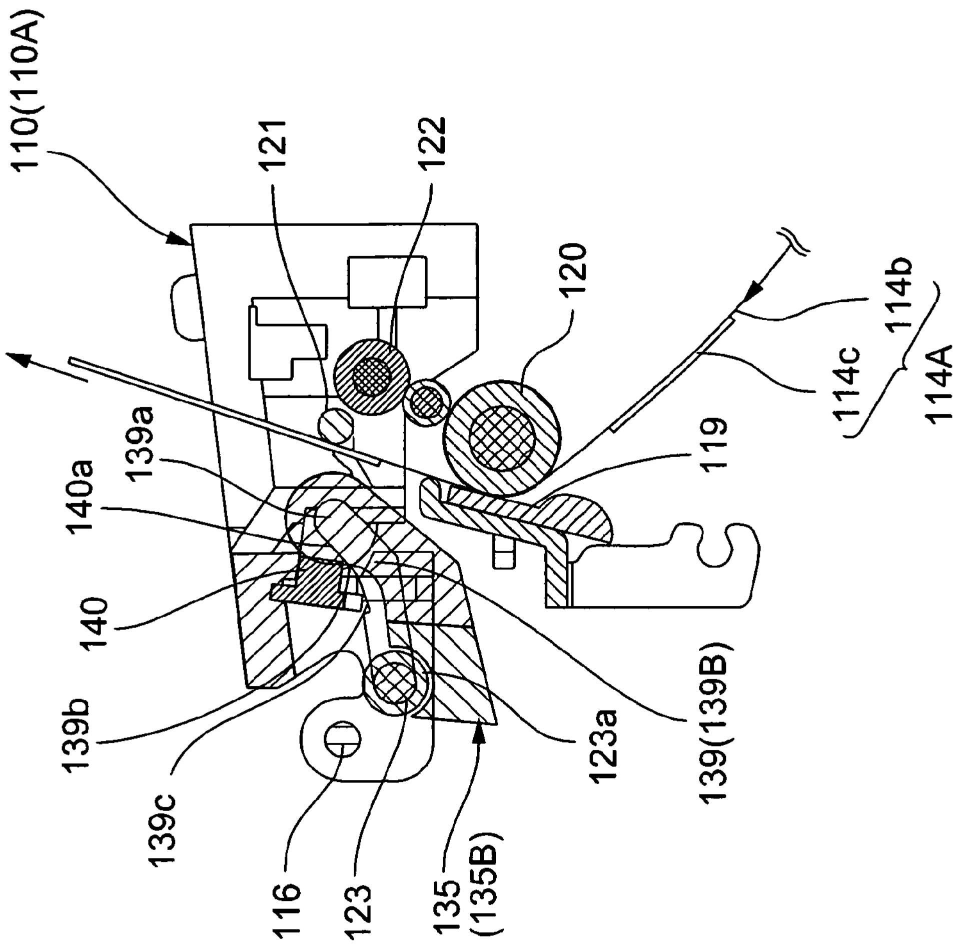
FIG. 15 describes the operation of the peeler mechanism shown in FIG. 10 when the label detection lever is retracted.

If the peeler unit 110 is closed with the web pressure roller support frame 135 set to the lower or second pivot position 135B as shown in FIG. 15, the web pressure roller 123 is set to the retracted position 123B removed to a position in front of the web transportation roller 122 and thus does not push against the web transportation roller 122. This is the retracted position of the peeler mechanism 130 in which the web 114*b* portion of the roll paper 114A is not conveyed around the peeler roller 121 and discharged from the web exit 111 and labels 114*c* are thus not peeled from the web 114*b*.

The peeler 130 can thus be easily set to the retracted, non-peeling, position by rotating the web pressure roller support frame 135 from the first pivot position 135A to the second pivot position 135B while the peeler unit 110 is open as shown in FIG. 11, and then simply closing the peeler unit 110.

The parts of the peeler mechanism are described in further detail next.

The unit frame 131 of the openable peeler unit 110 has a connecting portion 132 extending widthwise to the printer, and left and right arm portions 134, 133 extending from opposite ends of the connecting portion 132 toward the back of the printer. A shaft hole 133*a*, 134*a* is formed in the front end part of each arm portion 133, 134. Pivot shaft 116 rendered on the printer body side passes freely rotatably through the shaft holes 133*a*, 134*a* so that the unit frame 131 can pivot vertically open and closed on pivot shaft 116.

The web pressure roller support frame 135 attached to the unit frame 131 has left and right pivot arms 137, 136 extending in the front-back direction of the printer. A connecting portion 138 extending widthwise to the printer connects the end portions of these pivot arms 137, 136 at the back side of the printer, and the web pressure roller 123 is rendered freely rotatably below the connecting portion 138. The end parts of the pivot arms 137, 136 at the front side of the printer are attached to pivot freely up and down to the left and right arm portions 134, 133 of the unit frame 131.

A label detection lever 139 that pivots freely around the center shaft 123*a* of the web pressure roller 123 is attached to the web pressure roller support frame 135. This label detection lever 139 is held with a weak urging force (not shown) in a first position 139A straddling the label exit 112 in the front-back direction of the printer as shown in FIG. 13, is pushed up by the label 114*c* being discharged to the label exit 112, and can thus pivot up away from the label exit 112 as shown in FIG. 14.

A photocoupler 140 that functions as a lever detection unit is affixed to the connecting portion 132 of the unit frame 131. The detection range 140*a* of the photocoupler 140 is positioned at the pivot center of the web pressure roller support frame 135. The distal end 139*a* of the label detection lever 139 is positioned in this detection range 140*a*. When the label detection lever 139 is pushed up by a discharged label 114*c* and thus pivots, the distal end 139*a* is removed from the detection range 140*a* of the photocoupler 140. When the label detection lever 139 is thus no longer detected by the photocoupler 140, the photocoupler 140 outputs a label detection signal indicating that a label 114*c* is in the label exit 112.

Label Dispensing Operation

Operation of the peeler mechanism 130 thus arranged is described next. Labels can be dispensed one at a time in the label dispensing mode or continuously in the continuous label dispensing mode. In either case, however, label paper 114A having labels 114*c* of a specific length affixed at a specific interval to a long web 114*b* wound in paper roll 114 is held in a roll in the roll paper compartment 115.

In the label peeling mode in which the labels 114*c* are peeled and dispensed one at a time, the label paper 114A is fed as shown in FIG. 13 around the peeler roller 121, between the web transportation roller 122 and web pressure roller 123, and out from the web exit 111. When the label paper 114A is conveyed through this path, the web 114*b* is discharged from the web exit 111 but the stiffness of the label 114*c* affixed to the web 114*b* causes each label 114*c* to continue in a straight line at the peeler roller 121 instead of curving with the web 114*b* acutely around the peeler roller 121. The label 114*c* thus peels away from the surface of the web 114*b* and proceeds upward to the label exit 112.

As shown in FIG. 14, the label 114*c* is discharged while pushing the label detection lever 139 up away from the first position 139A spanning the label exit 112. This causes the distal end 139*a* of the label detection lever 139 to leave the detection range 140*a* of the photocoupler 140, and the photocoupler 140 thus outputs the label detection signal indicating that a label is in the label exit 112. That a label has been dispensed from the label exit 112 is thus detected, conveying the label paper 114A stops, and the printer waits for the label 114*c* to be removed. When the user removes the label 114*c*, the label detection lever 139 returns to the first position 139A shown in FIG. 13, and photocoupler 140 output stops. It is thus detected that the label 114*c* was removed and there is no label left in the label exit 112. The label discharge operation of conveying the label paper 114A and printing can then resume. By repeating this operation, labels 114*c* are issued one at a time as the operator removes each dispensed label.

The label detection lever 139 in this embodiment of the invention is located with its pivot point between the label exit 112 and the web discharge path 118*b*. As a result, the label 114*c* peeled from the web 114*b* at the peeler roller 121 is prevented from falling back to the web 114*b* and adhering to the web 114*b* once again in the label exit 112. More specifically, after the leading edge of the label 114*c* peeled from the web 114*b* contacts the label detection lever 139, the label detection lever 139 pivots in the label discharge direction, and the label 114*c* slides along the label contact surface 139*b* of the label detection lever 139 and is thus guided in the label discharge direction.

A shoulder 139*c* is formed on the label contact surface 139*b* of the label detection lever 139 at a position directly above the peeler roller 121 in this embodiment of the invention. If a label 114*c* falls back toward the web 114*b*, the leading edge of the label 114*c* contacts this shoulder 139*c*, is thus reliably prevented from falling to the web 114*b*, and is guided to the label exit 112 in conjunction with rotation of the label detection lever 139.

The surface of the label contact surface 139*b* is preferably shaped to contact the label 114*c* at a point or line so that the label 114*c* slides smoothly over the label contact surface 139*b*. Yet further preferably, the sliding resistance of the label contact surface 139*b* to the sliding label 114*c* is preferably low in the label discharge direction and greater in the opposite direction, thereby enabling the label 114*c* to be guided quickly in the label discharge direction along the label contact surface 139*b*.

The operation for outputting a continuous series of labels 114*c* on the web 114*b* is described next with reference to FIG. 15.

When operating in the continuous label dispensing mode, the pressure roller support frame 135 is rotated from the first pivot position 135A to the second pivot position 135B and the label paper 114A is fed passing out from the label exit 112. As described above, the label detection lever 139 is pivotally attached to the rotary shaft 123*a* of the web pressure roller 123 supported on the web pressure roller support frame 135. Therefore, when the web pressure roller support frame 135 is swung to the second pivot position 135B, the label detection lever 139 also retracts to the second position 139B where the label detection lever 139 does not interfere with the labels 114*c* discharged from the label exit 112 as shown in FIG. 15.

As also noted above, the label detection lever 139 detection range 140*a* of the photocoupler 140 is located at the pivot point of the web pressure roller support frame 135. Therefore, the distal end 139*a* of the label detection lever 139 remains in the detection range 140*a* of the photosensor 140 even when the web pressure roller support frame 135 is pivoted to the second pivot position 135B. The label detection signal is therefore not output from the photocoupler 140 and the photocoupler 140 remains in the output state indicating that a label 114*c* is not in the label exit 112. In other words, the label detection operation of the photocoupler 140 is disabled.

The labels 114*c* on the web 114*b* can thus be printed continuously without interrupting transportation of the label paper 114A, and the printed labels 114*c* can be issued continuously from the label exit 112 intact on the web 114*b*. The printer can therefore be controlled identically in both the continuous label dispensing mode and the label peeling mode without doing anything in particular and without requiring the operator to switch the operating mode.

A printer with a peeler mechanism according to this embodiment of the invention is characterized by having a peeler mechanism that peels printed labels from a web, a label exit from which the peeled labels are dispensed, a label detection lever that is held by a specific urging force (not shown) in a first position astride the label exit and can pivot in the label discharge direction when pushed up by a label being discharged, and a lever detection unit that detects when the label detection lever is in the foregoing first position.

When a label is discharged by this arrangement, the label causes the label detection lever to pivot in the label discharge direction and removes the label detection lever from the first position. The label continues pushing against the label detection lever as long as the label remains in the label exit, and the label detection lever therefore cannot return to the first position across the label exit. The operation for printing and dispensing the next label cannot start as long as the lever detection unit senses that the label detection lever is removed from this first position.

Whether a label remains in the label exit is thus detected by mechanical engagement with a label left in the label exit. Furthermore, because the lever detection unit for detecting the position of the label detection lever can be positioned inside the printer, outside light can be prevented from affecting the detection result even if a photocoupler or other optical sensor is used for the detection unit. Therefore, unlike when an optical sensor located near the label exit is used, detection errors caused by outside light, for example, can be prevented and whether a label is left in the label exit can be reliably detected.

Furthermore, if the label detection lever is retracted to a second position not in contact with the discharged label when labels are output continuously intact on the web, the lever detection unit will constantly detect the label detection lever, and lever detection unit output will constantly indicate that a label does not remain in the label exit. Operation in the continuous label dispensing mode can therefore be controlled based on output from the lever detection unit in the same way as when labels are dispensed one at a time. The printer can therefore operate in both modes without doing anything special, without requiring different control operations in the different modes, and without requiring the operator to switch the operating mode.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A printer which can store a web that has removable labels affixed thereto comprising:

a peeler mechanism having a peeler roller movable between a first peeling position for peeling labels from the web and a second or retracted position in which labels are not peeled from the web;

a label exit for discharging labels peeled from the web;

a web exit for discharging the web from the printer after the labels are peeled;

a label detection unit comprising an optical photosensor having a photoreceptor portion for detecting the presence and absence of a label at said label exit based upon the light output condition of said photoreceptor portion for optically detecting if a peeled label remains in the label exit, and a movable member responsive to the position of said peeler mechanism with said label detection unit being interconnected to said peeler mechanism such that when said peeler roller is set to said first position the output of said label detection unit is indicative of the presence and absence of a peeled label in the label exit and when said peeler roller is set to said retracted position said movable member is moved to a position covering said optical photosensor.

2. A printer as described in claim 1, wherein said movable member is a shield member for shielding at least the photoreceptor portion of the photosensor to prevent the output from said label detection unit from changing.

3. A printer as described in claim 2, wherein:

the peeler mechanism further comprises a linkage mechanism that moves the shield member in said label detection unit in conjunction with movement of the web pressure roller such that the shield member shields the photoreceptor portion of the photosensor in the retracted position; and wherein said peeler roller is a web pressure roller which is moved to a web pressure position in said first position, and is moved to the retracted position when the peeler mechanism is adjusted into the retracted position.

4. A printer as described in claim 3, wherein the peeler mechanism further comprises a pivot member that supports the web pressure roller, such that said pivot member can pivot between a first pivot position and a second pivot position for moving the web pressure roller between the web pressure position when the pivot member is in the first pivot position, and the retracted position when the pivot member is in the second pivot position; and wherein said linkage mechanism is a cam mechanism that converts the pivoting motion of the pivot member to the moving motion of the shield member.

5. A printer as described in claim 1, wherein the label detection unit comprises a movable label detection lever that is held by a specific urging force to stop in a first position straddling the label exit and can pivot in the label discharge direction when pushed by a discharged label, and a lever detection unit having a given detection range for detecting if the label detection lever is in the first position; and wherein label detection lever is moved to a second position not interfering with a label discharged from the label exit in conjunction with movement of said adjustable member into said retracted position ,and when said label detection lever is in said second position a part of the label detection lever is held constantly in the detection range of the lever detection unit to disable said label detection unit.

6. A printer as described in claim 5, wherein the label detection lever can pivot between said first position and said second position with the pivot point positioned in the detection range of the lever detection unit.

7. A printer as described in claim 6, wherein the peeler mechanism comprises a movable web pressure roller that can be moved between a web pressure position enabling the web to be conveyed after labels are peeled therefrom and said retracted position; and wherein the web pressure roller is in the web pressure position when the peeler mechanism is adjusted into the first position, and is moved to the retracted position when the peeler mechanism is adjusted into the retracted position.

8. A printer as described in claim 7, wherein the peeler mechanism comprises a pivot member that supports the web pressure roller;

said pivot member can pivot between a first pivot position and a second pivot position on a pivot point in the detection range of the lever detection unit, the web pressure roller is in the web pressure position when the pivot member is in the first pivot position, and the web pressure roller is in the retracted position when the pivot member is in the second pivot position; and said label detection lever is supported by said pivot member so that the label detection lever is in said first position when the pivot member is in the first pivot position, and the label detection lever switches to the second position when the pivot member rotates to the second pivot position.

9. A printer as described in claim 8, wherein the label detection lever supported by the pivot member in the first pivot position is positioned between the label exit and the web discharge path from which the web is discharged after labels are peeled.

10. A printer as described in claim 9, further comprising a guide unit for guiding labels in the label discharge direction with said guide unit formed on a label contact surface of the label detection lever contacted by the discharged labels.

11. A printer as described in claim 9, wherein said label detection lever has a label contact surface that contacts discharged labels with the label contact surface having a label sliding resistance in the label discharge direction which is less than the label sliding resistance in the opposite direction.

12. A printer as described in claim 9, wherein the label contact surface of the label detection lever that contacts discharged labels contacts the discharged labels at a point or line.

13. A printer which can store a web that has removable labels affixed thereto comprising:

a peeler mechanism having an adjustable member movable between a first peeling position for peeling labels from the web and a second or retracted position in which labels are not peeled from the web;

a label exit for discharging labels peeled from the web;

a web exit for discharging the web from the printer or after the labels are peeled;

a print head for printing to the labels;

a paper transportation mechanism;

a label detection unit comprising an optical photosensor having a photoreceptor portion for optically detecting the presence and absence of a label at said label exit, and a movable member responsive to the position of said peeler mechanism wherein said label detection unit is interconnected to said adjustable member such that when the adjustable member is set to said first position said label detection unit detects the presence and absence of a peeled label and when said adjustable member is set to said retracted position said movable member is moved to a position covering said optical photosensor; and a drive control unit that controls driving the print head and paper transportation mechanism based upon a determination of whether the peeler mechanism is in the peeling first position or in the retracted position.

14. A printer as described in claim 13 wherein said drive control unit is responsive to a change in the output of said label detection unit and to when said label detection unit is disabled for determining whether the peeler mechanism is in the peeling first position or in the retracted position.

* * * * *